(12) United States Patent
Yoshiya

(10) Patent No.: US 9,052,344 B2
(45) Date of Patent: Jun. 9, 2015

(54) CURRENT DETECTION CIRCUIT, MOTOR DRIVING DEVICE, MAGNETIC DISK STORAGE DEVICE, AND ELECTRONIC APPLIANCE

(71) Applicant: Rohm Co., Ltd., Kyoto (JP)

(72) Inventor: Takashi Yoshiya, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 14/264,558

(22) Filed: Apr. 29, 2014

(65) Prior Publication Data

US 2014/0321001 A1 Oct. 30, 2014

(30) Foreign Application Priority Data

Apr. 30, 2013 (JP) ................................ 2013-095095

(51) Int. Cl.
*G11B 19/20* (2006.01)
*G01R 19/30* (2006.01)
*H02P 3/14* (2006.01)
*G11B 19/28* (2006.01)

(52) U.S. Cl.
CPC .......... *G01R 19/30* (2013.01); *H02P 3/14* (2013.01); *G11B 19/28* (2013.01)

(58) Field of Classification Search
None
See application file for complete search history.

(56) References Cited

U.S. PATENT DOCUMENTS

| 6,998,801 | B2 * | 2/2006 | Kurosawa et al. ...... 318/400.27 |
| 7,119,508 | B2 * | 10/2006 | Kurosawa et al. ...... 318/400.04 |
| 7,158,332 | B2 * | 1/2007 | Kokami ......................... 360/75 |
| 2011/0090775 | A1 | 4/2011 | Miyagoe et al. |

FOREIGN PATENT DOCUMENTS

WO          2009/150794          12/2009

* cited by examiner

*Primary Examiner* — K. Wong
(74) *Attorney, Agent, or Firm* — Fish & Richardson P.C.

(57) ABSTRACT

A current detection circuit for detecting a maximum current value in a three-phase motor includes an identifier configured to identify a maximum current phase having the maximum current value among phases of the motor, and a detector configured to detects the maximum current value by summing current values of phases other than the maximum current phase when the current direction in the maximum current phase is a predetermined first direction.

9 Claims, 23 Drawing Sheets

CURRENT DETECTION CIRCUIT, MOTOR DRIVING DEVICE, MAGNETIC DISK STORAGE DEVICE, AND ELECTRONIC APPLIANCE

CROSS-REFERENCE TO RELATED APPLICATIONS

This application is based on Japanese Patent Application No. 2013-095095 filed on Apr. 30, 2013, the contents of which are hereby incorporated by reference.

BACKGROUND OF THE INVENTION

1. Field of the Invention

The present invention relates to a current detection circuit, and a motor driving device, a magnetic disk storage device, and an electronic appliance using the current detection circuit.

2. Description of Related Art

Conventionally, there is used a motor driving device for driving a motor using a voltage supplied to a power supply line. Such a motor driving device includes, for example, a switch for switching connection/disconnection between each phase of the motor and the power supply line and a switch for switching connection/disconnection between each phase of the motor and a ground point. When these switching of the switches are performed appropriately, the motor can be driven.

Note that there is a PCT publication WO2009/150794 as a related art of the present invention.

Here, if a maximum current in the motor (that means current of a maximum value among currents flowing in phases in this specification) is too large, it is necessary to perform an operation for securing safety of the device, for example. Therefore, the motor driving device is required to have a function of detecting a maximum current value (that means a value of the maximum current). With this function, the motor driving device can perform the operation when the maximum current value exceeds a predetermined threshold value, for example.

However, it may be difficult to directly detect the maximum current value depending on a direction of the maximum current in the motor. For instance, when brake control of a three-phase motor having an A-phase, a B-phase, and a C-phase is performed (when low side FETs of all phases are turned on), if current flows from the A-phase to the B-phase and the C-phase, current flowing in the path from the ground point to the motor via the low side FET of the A-phase becomes the maximum current. In this case, a terminal voltage of the A-phase becomes a negative voltage, and a parasitic diode of the switch may operate. In this case, it is not easy to directly detect the maximum current value.

SUMMARY OF THE INVENTION

In view of the above-mentioned problem, it is an object of the present invention to provide a current detection circuit, and a motor driving device, a magnetic disk storage device, and an electronic appliance using the current detection circuit, which can easily detect the maximum current value regardless of a direction of the maximum current in the motor.

A current detection circuit according to the present invention is a current detection circuit for detecting a maximum current value in a three-phase motor, including an identifier configured to identify a maximum current phase having a maximum current value among phases of the motor, and a detector configured to detect the maximum current value by adding current values of other phases than the maximum current phase when a current direction in the maximum current phase is a predetermined first direction.

Note that other features, elements, steps, advantages, and characteristics of the present invention will become more apparent from the following description of embodiments with reference to the attached drawings.

DETAILED DESCRIPTION OF THE PREFERRED EMBODIMENTS

Embodiments of the present invention are described below with reference to the drawings, in which first to third embodiments are exemplified.

1. First Embodiment

Figure 1:
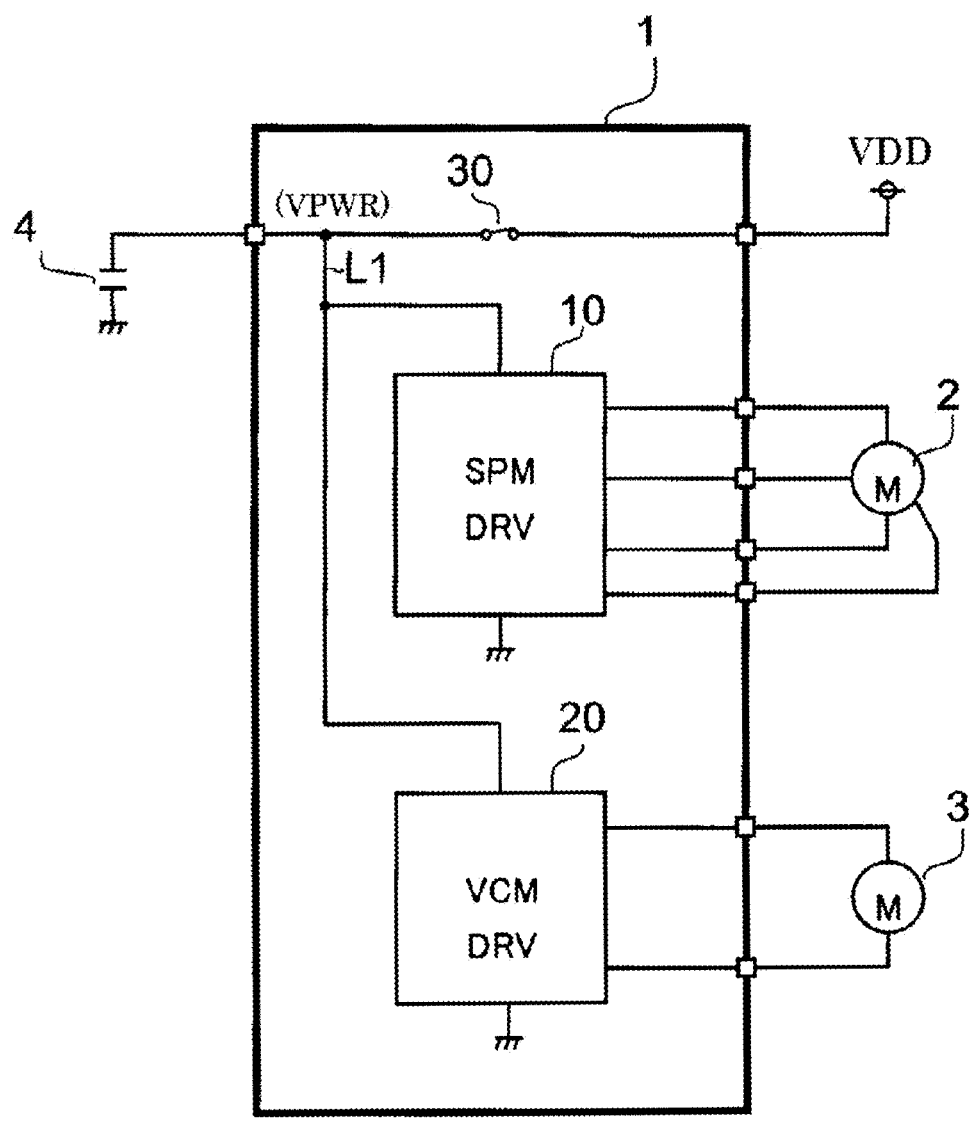
FIG. 1 is a block diagram of a motor driving device and its peripherals according to this embodiment.

First, the first embodiment is described. FIG. 1 is a block diagram of a motor driving device 1 and its peripherals according to this embodiment. The motor driving device 1 is a monolithic semiconductor integrated circuit device (so-called system motor driver IC) for performing drive control of a spindle motor 2 and a voice coil motor 3 used for a hard disk drive.

The motor driving device 1 includes a spindle motor drive unit 10, a voice coil motor drive unit 20, an insulation switch 30, and a power supply line L1. Note that the entire structure of a hard disk drive provided with the motor driving device 1 is described later in detail.

The spindle motor drive unit 10 drives to rotate the spindle motor 2 using a power supply voltage VDD supplied from a host outside the device to the power supply line L1. In this way, the spindle motor drive unit 10 rotates a platter (magnetic disk) at a constant rotational frequency. Note that the spindle motor 2 is a three-phase brushless DC motor having an A-phase, a B-phase, and a C-phase.

In addition, the spindle motor drive unit 10 can perform a synchronous rectifying operation when the power supply voltage VDD is abnormal (in disconnection of power supply or in instantaneous interruption of power supply). This synchronous rectifying operation is an operation for efficiently perform voltage regeneration to the power supply line L1 by generating a rectified voltage (a voltage obtained by rectifying) from phase voltages generated when the spindle motor 2 idles. This rectified voltage is supplied to individual portions of the motor driving device 1 (the voice coil motor drive unit 20 and the like) via the power supply line L1.

The voice coil motor drive unit 20 is connected to the power supply line L1. When the power supply voltage VDD is normal, the power supply voltage VDD is used for driving the voice coil motor 2 so that a magnetic head moves on the platter as tracking movement.

On the other hand, when the power supply voltage VDD is abnormal, the voice coil motor drive unit 20 uses the voltage regenerated from the spindle motor drive unit 10 to the power supply line L1 so that the voice coil motor 2 can be driven. In this way, it is possible to automatically retreat the magnetic head to a ramp mechanism outside the outermost periphery of the platter. Because this power off retract function is provided, when the power supply voltage VDD is abnormal, it is possible to avoid collision between the magnetic head and the platter.

The insulation switch 30 is a back current prevention element to connect/disconnect between a power supply pin of the motor driving device 1 (external terminal to which the power supply voltage VDD is applied) and the power supply line L1. The insulation switch 30 is turned on when the power supply voltage VDD is normal, and it is turned off when the power supply voltage VDD is abnormal. A metal oxide semiconductor (MOS) field-effect transistor or a diode can be appropriately used as the insulation switch 30.

The power supply line L1 is a conductive member (metal wiring) to which the power supply voltage VDD is applied. Note that a voltage smoothing capacitor 4 is externally connected to the power supply line L1. In the following description, a voltage of the power supply line L1 may be referred to as a voltage VPWR.

Figure 2:
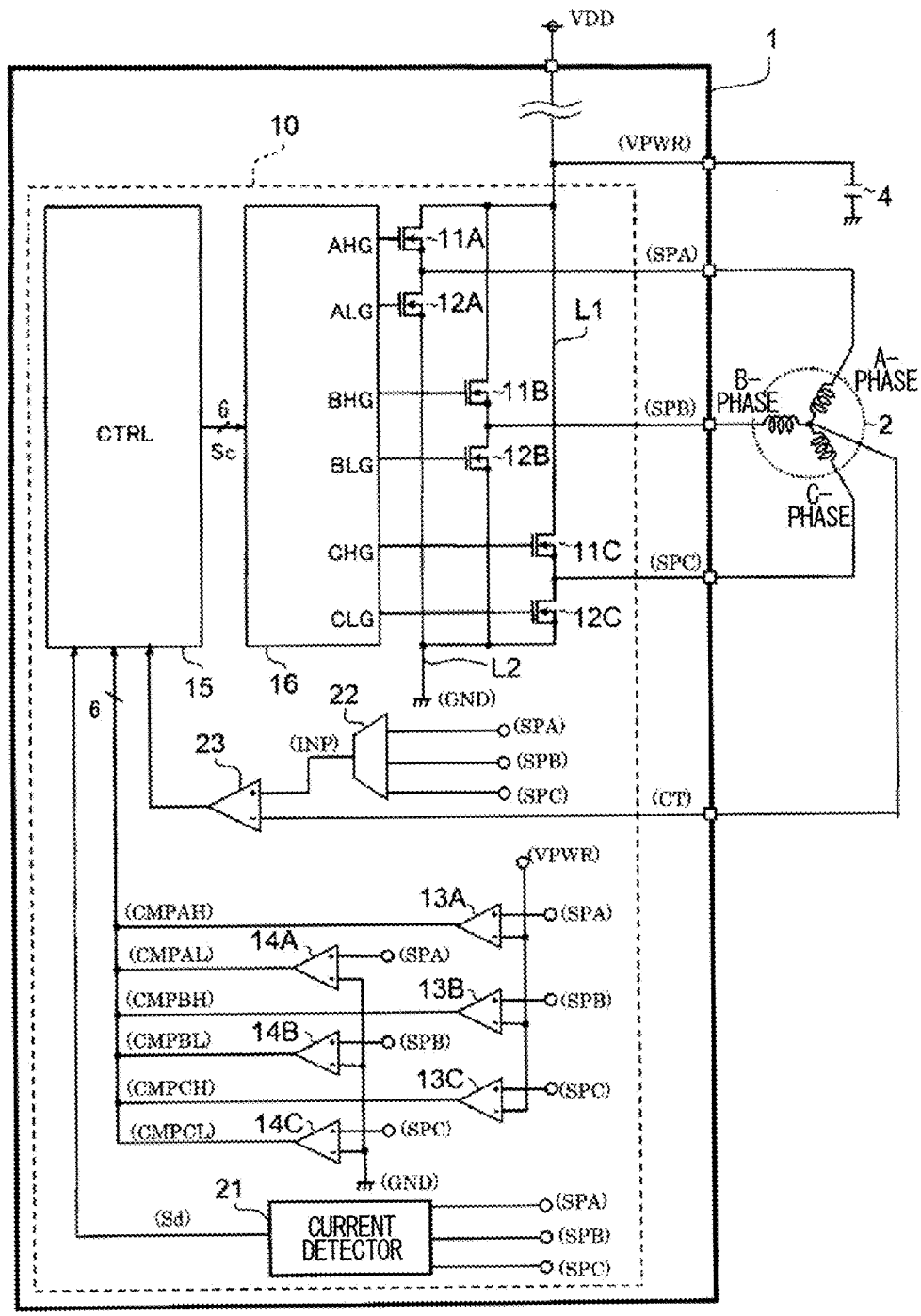
FIG. 2 is a structural diagram of the motor driving device and its peripherals according to a first embodiment.

FIG. 2 is a structural diagram of the motor driving device 1 and its peripherals. Note that FIG. 2 illustrates a part of the spindle motor drive unit 10 in detail, and other part is partially omitted.

As illustrated in FIG. 2, the spindle motor drive unit 10 includes a power supply line L1, a ground line L2, an upper switch 11x (here, "x" represents each of A to C, and the same is true in the following description), a lower switch 12x, an upper comparator 13x, a lower comparator 14x, a control unit 15, a predriver unit 16, a current detector 21, a selection circuit 22, and a BEMF comparator 23.

The ground line L2 is a line connected to a ground point (ground voltage GND). Note that the ground line L2 may be connected to a ground point outside the motor driving device 1.

The upper switch 11x is a switching element (N-channel MOS field-effect transistor) for connecting/disconnecting between each phase terminal of the spindle motor 2 and the power supply line L1. The upper switch 11x is turned on (conductive) when an upper gate signal xHG is high level and is turned off (nonconductive) when the upper gate signal xHG is low level. Note that a P-channel MOS field-effect transistor can be used as the upper switch 11x.

The lower switch 12x is a switching element (N-channel MOS field-effect transistor) for connecting/disconnecting between each phase terminal of the spindle motor 2 and the ground line L2. The lower switch 12x is turned on (conductive) when a lower gate signal xLG is high level and is turned off (nonconductive) when the lower gate signal xLG is low level.

The upper comparator 13x compares the voltage VPWR with a phase voltage SPx of each phase terminal of the spindle motor 2 so as to generate an upper comparison signal CMPxH indicating a result of the comparison. The lower comparator 14x compares the ground voltage GND with the phase voltage SPx so as to generate a lower comparison signal CMPxL indicating a result of the comparison.

The control unit 15 generates and outputs switch control signals Sc (six channels including three upper phases and three lower phases) so as to control the switches (11x and 12x). The control unit 15 controls the switches (11x and 12x) so that a rotational frequency of the spindle motor 2 becomes constant in a normal operation.

The predriver unit 16 generates the gate signals xHG and xLG so that ON/OFF switching of switches (11x and 12x) is performed in accordance with the switch control signal Sc supplied from the control unit 15.

The current detector 21 detects a maximum current value in the spindle motor 2 and compares the detection result with a predetermined threshold value. Note that the specific structure, operation, and the like of the current detector 21 will be described later in detail.

The selection circuit 22 is supplied with all the phase voltages (SPA to SPC) as input voltages. The selection circuit 22 selects one of the input voltages and output it as a signal INP.

A noninverting input terminal of the BEMF comparator 23 is supplied with the signal INP, and an inverting input terminal of the same is supplied with a voltage CT as a voltage at a neutral point of the spindle motor 2 (neutral point voltage). The BEMF comparator 23 is used mainly for detecting a rotation speed of the spindle motor 2.

For instance, when the signal INP is the phase voltage SPA, the output signal of the BEMF comparator 23 becomes a pulse signal having the same period as a rotation period of the spindle motor 2. Therefore, the control unit 15 can monitor the rotation speed of the spindle motor 2 by receiving the output signal of the BEMF comparator 23.

Note that when an abnormality occurs in the motor driving device 1 or its peripherals, the spindle motor 2 may be a state to be safely stopped. When the spindle motor 2 should be stopped in this way (in motor brake), the control unit 15 controls to perform operation suitable for the circumstance.

More specifically, an operation mode of the spindle motor drive unit 10 in the motor brake is basically switched between a synchronous rectifying mode and a coast mode.

The synchronous rectifying mode is an operation mode in which the synchronous rectifying operation described above is performed. For instance, in a circumstance where a drop of the voltage VPWR is relatively large due to abnormality of the power supply voltage VDD or the like and the drop of the voltage VPWR can be suppressed by the synchronous rectifying operation, the operation mode of the spindle motor drive unit 10 becomes the synchronous rectifying mode. On the other hand, the coast mode is an operation mode in which the synchronous rectifying operation is not performed. For instance, in a circumstance where the drop of the voltage VPWR is relatively small (or no drop), the operation mode of the spindle motor drive unit 10 becomes the coast mode.

In the synchronous rectifying mode, the control unit 15 controls the switches (11x and 12x) so that the synchronous rectifying operation is performed. On the other hand, in the coast mode, the control unit 15 controls the switches (11x and 12x) to be turned off, for example. Note that the control form of the switches (11x and 12x) in the coast mode may be other form.

In addition, the control unit 15 monitors the rotation speed of the spindle motor 2 in the motor brake and reflects a result of the monitor on an operation of the spindle motor drive unit 10. For instance, when the rotation speed becomes lower than a predetermined reference value, it is determined that the spindle motor 2 becomes a state to be safely stopped. Therefore, in this case, the control unit 15 stops to control the switches (11x and 12x) regardless of the operation mode of the spindle motor drive unit 10, for example.

[About Synchronous Rectifying Operation]

Figure 3:
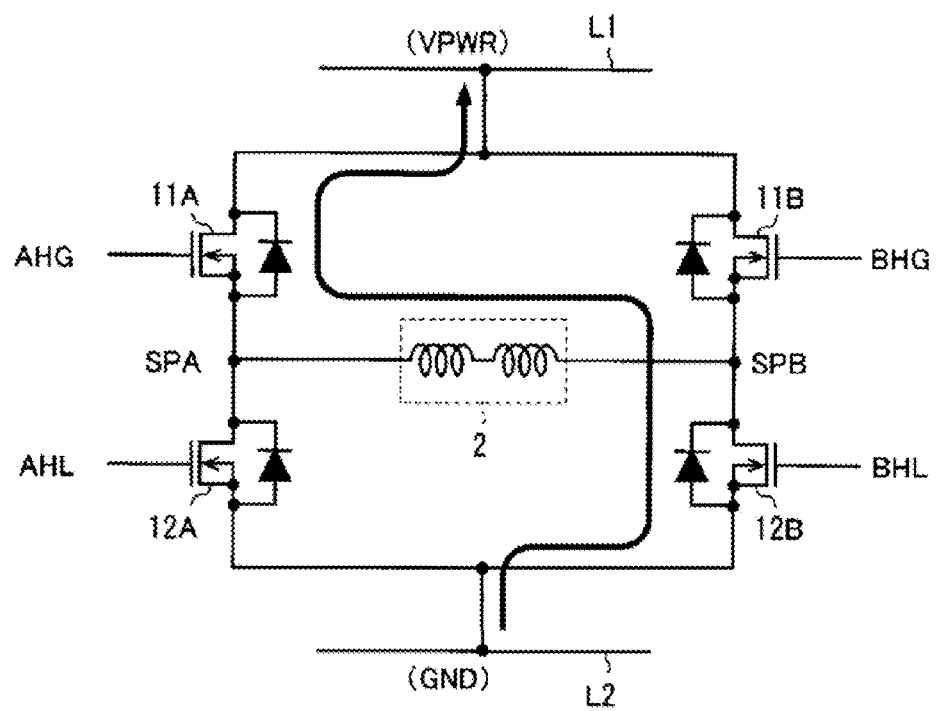
FIG. 3 is a schematic diagram illustrating a manner in which regenerative current flows.

FIG. 3 is a schematic diagram illustrating a manner in which regenerative current flows from the ground line L2 to the power supply line L1 via an output stage of the spindle motor drive unit 10. This dialog illustrates a manner in which the regenerative current flows in a path indicated by a thick arrow (in order of L2, 12B, 2, 11A, and L1) because of a difference between the phase voltage SPA and the phase voltage SPB.

In this case, if both the upper switch 11A and the lower switch 12B are turned off, the regenerative current flows through body diodes parasitizing to the upper switch 11A and the lower switch 12B, and hence there occurs an energy loss corresponding to forward drop voltages generated by the body diodes (=2×Vf).

Therefore, the control unit 15 controls the spindle motor drive unit 10 to perform the synchronous rectifying operation so that the energy loss is reduced and the regeneration is efficiently performed. Here, a specific content of the synchronous rectifying operation is described below with reference to FIG. 4.

Figure 4:
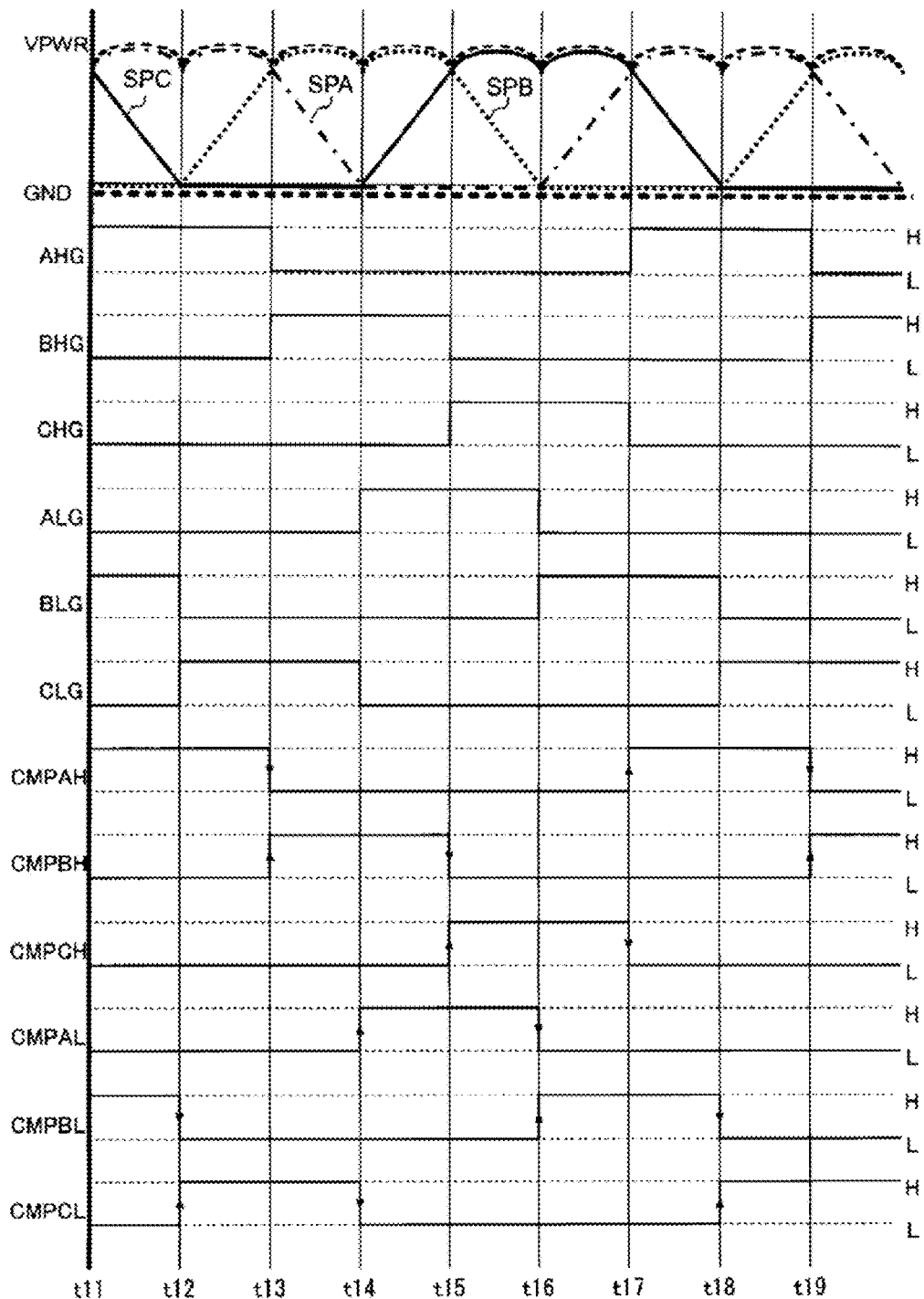
FIG. 4 is a timing chart of synchronous rectifying operation.

FIG. 4 shows an example of a timing chart of the synchronous rectifying operation. In order from the upper part, there are shown the phase voltage SPx (with the voltage VPWR and the voltage GND), the upper gate signal xHG, the lower gate signal xLG, the upper comparison signal CMPxH, and the lower comparison signal CMPxL. Note that in FIG. 4, time elapses from time point t11 to time point t19.

From the time point t11 to the time point t12, an upper gate signal AHG and a lower gate signal BLG are set to high level, and other gate signals are set to low level. In this case, in the output stage of the spindle motor drive unit 10, the regenerative current flows mainly in a first path (in order of L2, 12B, 2, 11A, and L1), and the capacitor 4 is charged. In this case, a voltage value of the voltage VPWR (broken line) depends on a voltage value of the phase voltage SPA (dot-dashed line).

From the time point t12 to the time point t13, the upper gate signal AHG and a lower gate signal CLG are set to high level, and other gate signals are set to low level. In this case, in the output stage of the spindle motor drive unit 10, the regenerative current flows mainly in a second path (in order of L2, 12C, 2, 11A, and L1), and the capacitor 4 is charged. In this case, the voltage value of the voltage VPWR depends on the voltage value of the phase voltage SPA.

From the time point t13 to the time point t14, an upper gate signal BHG and the lower gate signal CLG are set to high level, and other gate signals are set to low level. In this case, in the output stage of the spindle motor drive unit 10, the regenerative current flows mainly in a third path (in order of L2, 12C, 2, 11B, and L1), and the capacitor 4 is charged. In this case, the voltage value of the voltage VPWR depends on a voltage value of the phase voltage SPB (dotted line).

From the time point t14 to the time point t15, the upper gate signal BHG and a lower gate signal ALG are set to high level, and other gate signals are set to low level. In this case, in the output stage of the spindle motor drive unit 10, the regenerative current flows mainly in a fourth path (in order of L2, 12A, 2, 11B, and L1), and the capacitor 4 is charged. In this case, the voltage value of the voltage VPWR depends on a voltage value of the phase voltage SPB.

From the time point t15 to the time point t16, an upper gate signal CHG and the lower gate signal ALG are set to high level, and other gate signals are set to low level. In this case, in the output stage of the spindle motor drive unit 10, the regenerative current flows mainly in a fifth path (in order of L2, 12A, 2, 11C, and L1), and the capacitor 4 is charged. In this case, the voltage value of the voltage VPWR depends on a voltage value of the phase voltage SPC (solid line).

From the time point t16 to the time point t17, the upper gate signal CHG and the lower gate signal BLG are set to high level, and other gate signals are set to low level. In this case, in the output stage of the spindle motor drive unit 10, the regenerative current flows mainly in a sixth path (in order of L2, 12B, 2, 11C, and L1), and the capacitor 4 is charged. In this case, the voltage value of the voltage VPWR depends on a voltage value of the phase voltage SPC. The same operation is repeated afterwards, and the drop of the voltage VPWR is suppressed by the rectified voltage.

As described above, the control unit 15 generates the switch control signal Sc so that the upper switch 11x of the phase having the phase voltage SPx higher than the voltage VPWR is turned on and that the upper switch 11x of the phase having the phase voltage SPx lower than the voltage VPWR is turned off. In other words, the control unit 15 generates the switch control signal Sc so as to turn on the upper switch 11x of each phase in which current can flow from the spindle motor 2 to the power supply line L1 and to turn off the upper switch 11x of each phase in which the current can flow from the power supply line L1 to the spindle motor 2.

In addition, the control unit 15 generates the switch control signal Sc so as to turn on the lower switch 12x of the phase having the phase voltage SPx lower than the voltage GND and to turn off the lower switch 12x of the phase having the phase voltage SPx higher than the voltage GND. In other words, the control unit 15 generates the switch control signal Sc so as to turn on the lower switch 12x of each phase in which current can flow from the ground line L2 to the spindle motor 2, and to turn off the lower switch 12x of each phase in which current can flow from the spindle motor 2 to the ground line L2.

In this way, the control unit 15 switches the phase of the synchronous rectifying operation at an appropriate timing in accordance with directions of the currents flowing in the upper switch 11x and in the lower switch 12x. Note that in a circumstance where the voltage VPWR is always higher than the phase voltage SPx, the spindle motor drive unit 10 becomes the coast mode, for example, and the synchronous rectifying operation is not performed.

[Detection of Maximum Current Value]

In motor brake, if the maximum current value of the spindle motor 2 is too large, it is necessary to perform operation for securing safety of the device. Note that terms "maximum current" and "maximum current value" in the following description mean those of the spindle motor 2 unless otherwise noted.

The spindle motor drive unit 10 has a structure in which the current detector 21 detects the maximum current value, and the operation is performed based on whether or not the maximum current value is larger than a predetermined threshold value Th. For instance, if the maximum current value is larger than the threshold value Th, the control unit 15 controls the switches (11x and 12x) so that the maximum current value is decreased regardless of the operation mode of the spindle motor drive unit 10. Note that how information of the maximum current value detected by the current detector 21 is used is not limited to this form.

Figure 5:
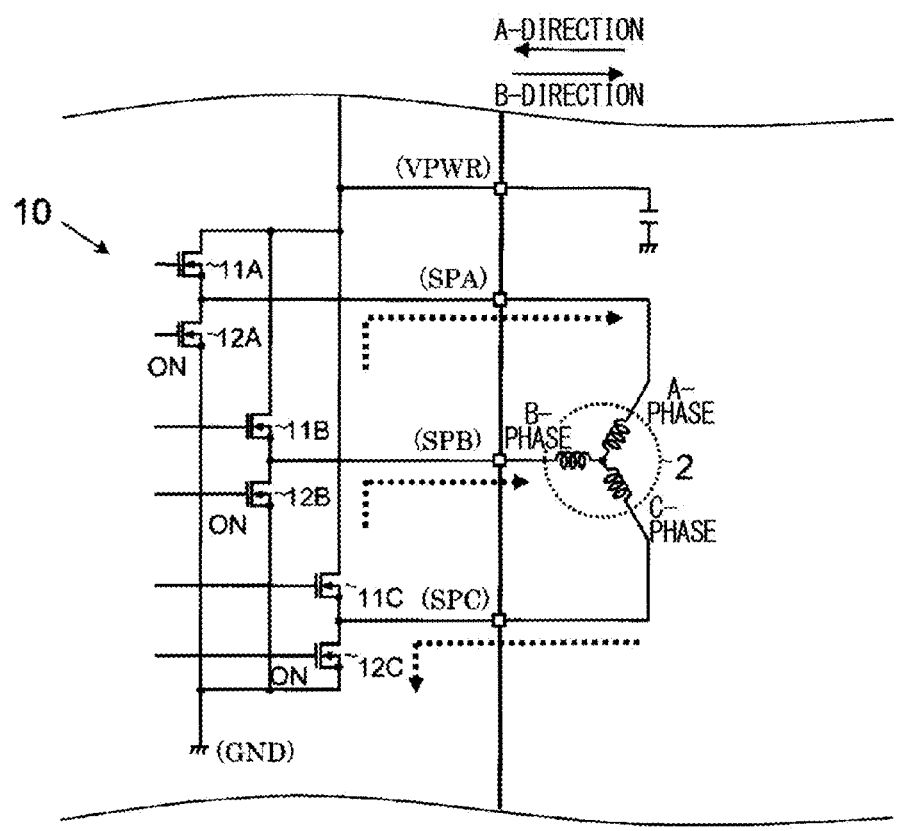
FIG. 5 is an explanatory diagram of a pattern of direction of current flowing in a spindle motor.
Figure 6:
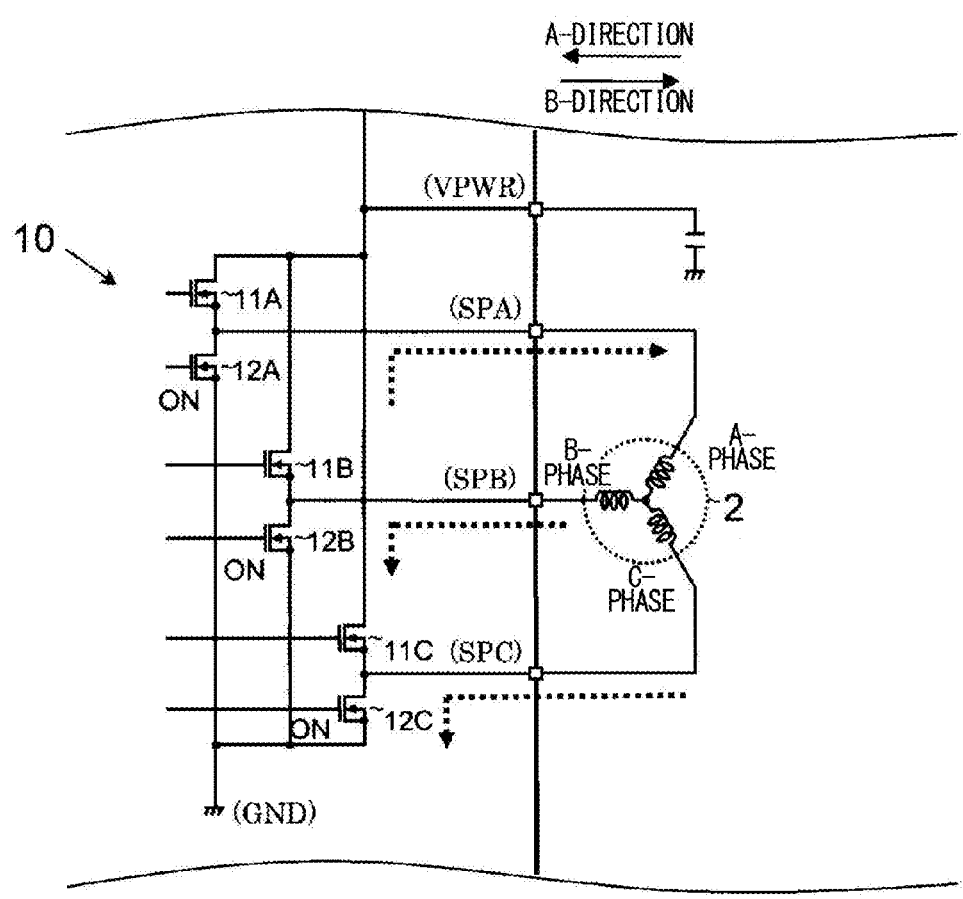
FIG. 6 is an explanatory diagram of a pattern of direction of current flowing in the spindle motor.

Here, patterns of direction of the current flowing in the spindle motor 2 includes, in accordance with an operation state of the spindle motor drive unit 10, a first pattern in which the direction in which the maximum current flows is the direction from the spindle motor 2 to the spindle motor drive unit 10 (referred to as a "a-direction" for convenience sake) and a second pattern in which the direction in which the maximum current flows is the direction from the spindle motor drive unit 10 to the spindle motor 2 (referred to as a "b-direction" for convenience sake). FIG. 5 illustrates an example of the first pattern, and FIG. 6 illustrates an example of the second pattern. Note that in these diagrams, a dotted line arrow indicates the current direction.

The example illustrated in FIG. 5 is an example in which current flows in the b-direction in the A-phase and in the B-phase, while the current flows in the a-direction in the C-phase. In this case, the current flowing in the C-phase (namely, the current flowing in the lower switch 12C in the direction from drain to source) becomes the maximum current.

In this case, the phase voltage SPC becomes a positive voltage, and it is relatively easy to detect the maximum current value. Note that as the first pattern, other than the example illustrated in FIG. 5, there are another example in which current flows in the b-direction in the A-phase and in the C-phase while current flows in the a-direction in the B-phase, and another example in which current flows in the b-direction in the B-phase and in the C-phase while current flows in the a-direction in the A-phase. In each of these examples, similarly to the example illustrated in FIG. 5, it is relatively easy to detect the maximum current value.

On the other hand, the example illustrated in FIG. 6 is an example in which current flows in the b-direction in the A-phase while current flows in the a-direction in the B-phase and in the C-phase. In this case, the current flowing in the A-phase (namely, current flowing in the lower switch 12A in the direction from source to drain) becomes the maximum current.

In this case, the phase voltage SPA becomes a negative voltage, and the parasitic diode of the lower switch 12A works at the same time. Therefore, it is difficult to directly detect the maximum current value. Note that as the second pattern, other than the example illustrated in FIG. 6, there are another example in which current flows in the b-direction in the B-phase while current flows in the a-direction in the A-phase and in the C-phase, and another example in which current flows in the b-direction in the C-phase while current flows in the a-direction in the A-phase and in the B-phase. In each of these examples, similarly to the example illustrated in FIG. 6, it is difficult to directly detect the maximum current value.

Here, it is understood that in a case of a three-phase motor, the maximum current value is a sum of the current values of other two phases. In addition, in a case of the second pattern, the current direction of the two phases is the a-direction. It is relatively easy to detect the sum of the current values of the two phases.

Therefore, the current detector 21 is devised to detect the maximum current value by adding the current values of the two phases in the case of the second pattern. In this way, compared with the case where the maximum current value is directly detected, it is possible to easily detect the maximum current value.

[Structure Etc. of Current Detector]

Figure 7:
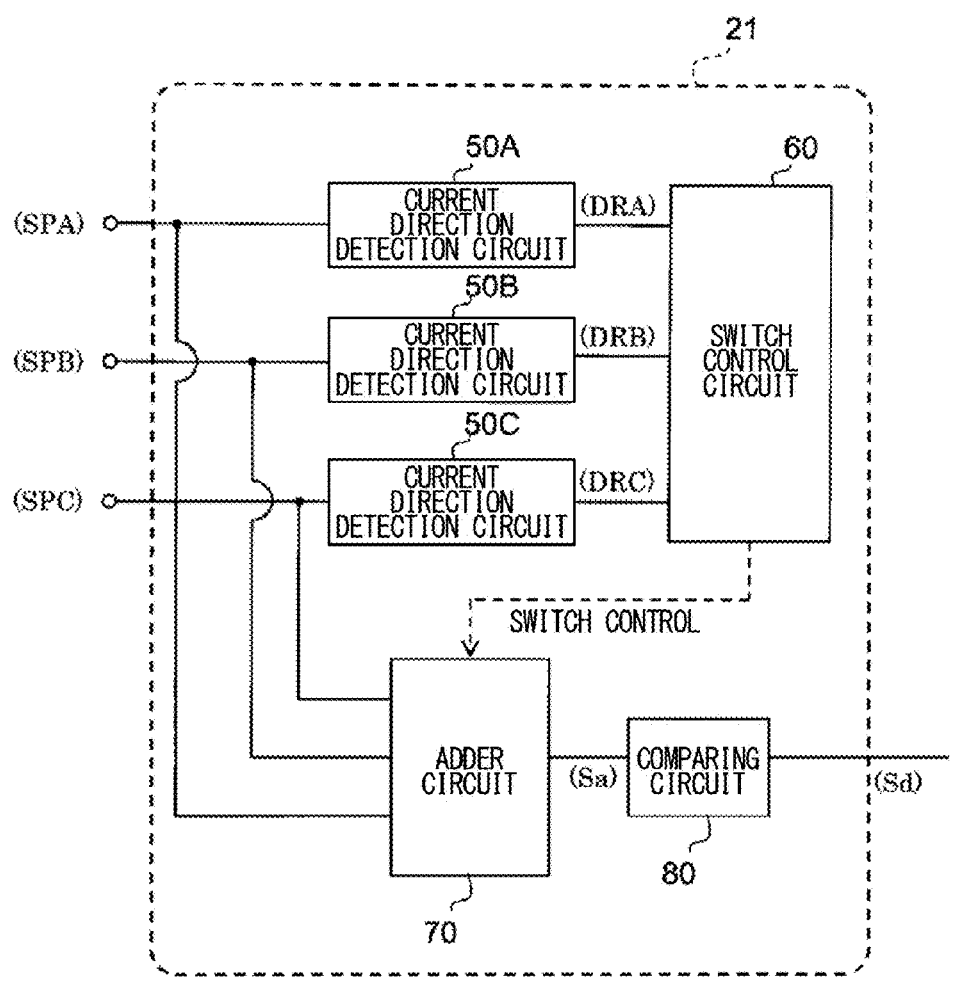
FIG. 7 is a block diagram of a structure of a current detector according to this embodiment.

Next, a structure and the like of the current detector 21 are described in detail. FIG. 7 is a block diagram of a structure of the current detector 21. As illustrated in this diagram, the current detector 21 includes current direction detection circuits 50x, a switch control circuit 60, an adder circuit 70, and a comparing circuit 80.

The current direction detection circuit 50x detects a current direction in an x-phase based on the phase voltage SPx and outputs a signal DRx indicating a result of the detection. Note that the current direction detection circuit 50x detects the current direction in the x-phase theoretically by comparing the phase voltage SPx with the ground voltage GND.

The switch control circuit 60 identifies a phase having the maximum current value (hereinafter may be referred to as a "maximum current phase") among the A to C-phases and the current direction of the maximum current phase (namely, the first pattern or the second pattern), based on the signal DRx received from the current direction detection circuit 50x.

Note that the switch control circuit 60 theoretically identifies a phase having different current direction from other two phases among the A to C-phases as the maximum current phase. The switch control circuit 60 controls switching of the switch disposed in the adder circuit 70 based on the identified information.

The adder circuit 70 receives the phase voltages (SPA to SPC) of the phases and outputs a voltage signal Sa corresponding to the maximum current value.

The comparing circuit 80 receives the voltage signal Sa and outputs to the control unit 15 a signal Sd (comparison signal) indicating whether or not the maximum current value is higher than the threshold value Th. In this way, the spindle motor drive unit 10 can operate in accordance with whether or not the maximum current value is higher than the threshold value Th.

Figure 8:
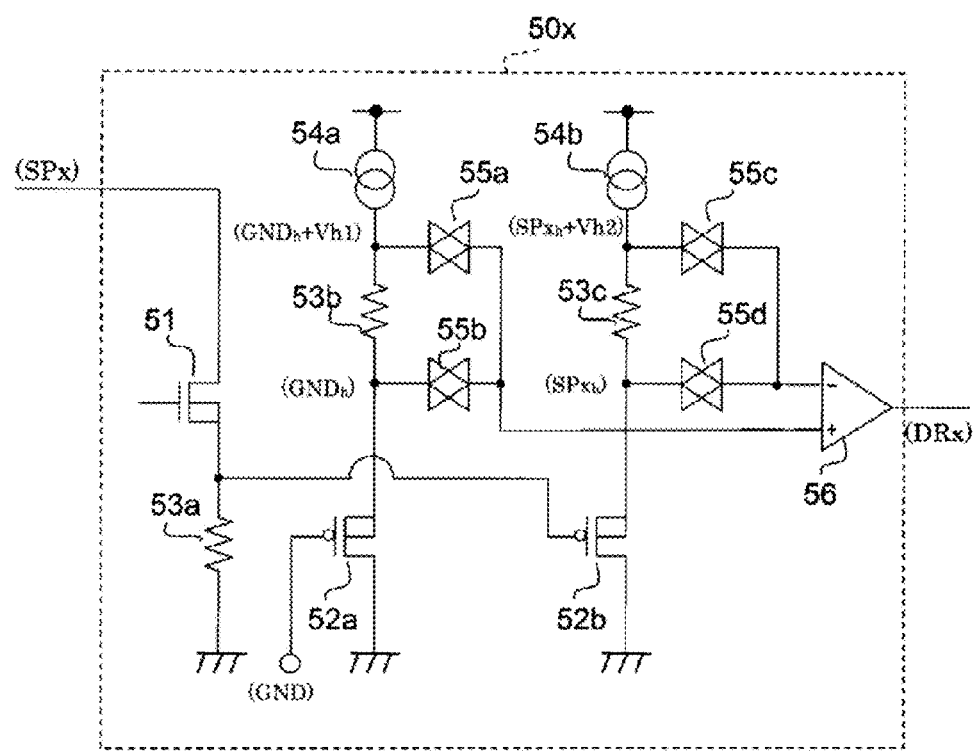
FIG. 8 is a structural diagram of a current direction detection circuit according to this embodiment.

FIG. 8 is a structural diagram of the current direction detection circuit 50x. As illustrated in this diagram, the current direction detection circuit 50x includes a switching element 51 (N-channel MOS field-effect transistor), switching elements 52a to 52b (P-channel MOS field-effect transistors), resistors 53a to 53c, constant current sources 54a to 54b, switches 55a to 55d, and a comparator 56.

The switching element 51 has a drain supplied with the phase voltage SPx and a source connected to the ground via the resistor 53a. A gate of the switching element 51 is supplied with an H level signal in a case where the current direction detection circuit 50x should be operated and is supplied with a L level signal in the other case.

The switching element 52a has a source connected to the constant current source 54a via the resistor 53b and a drain connected to the ground. The ground voltage GND is applied to a gate of the switching element 52a. The switching element 52b has a source connected to the constant current source 54b via the resistor 53c and a drain connected to the ground. The gate of the switching element 52a is connected to a node between the switching element 51 and the resistor 53a, and is supplied with the voltage SPx when the switching element 51 is conductive.

A noninverting input terminal of the comparator 56 is connected to a node between the constant current source 54a and the resistor 53b via the switch 55a and is connected to a node between the resistor 53b and the switching element 52a via the switch 55b. In addition, an inverting input terminal of the comparator 56 is connected to a node between the constant current source 54b and the resistor 53c via the switch 55c and is connected to a node between the resistor 53c and the switching element 52b via the switch 55d.

Note that the comparator 56 has a theoretical role to compare the phase voltage SPx with the ground voltage GND. However, in order to prevent the operation from being unstable due to fluctuation or the like of the phase voltage SPx, the comparator 56 operates with a hysteresis by switching of the switches (55a to 55d). The switches (55a and 55b) connected to the noninverting input terminal of the comparator 56, and the switches (55c and 55d) connected to the inverting input terminal are controlled so that one of the switches becomes conductive.

The noninverting input terminal of the comparator 56 is supplied with a voltage $GND_h$ in which the ground voltage GND is increased by a predetermined value by the switching element 52a when the switch 55b becomes conductive, and is supplied with a voltage $GND_h+Vh1$ (Vh1 is a voltage generated when current flows in the resistor 53b) when the switch 55a becomes conductive.

The inverting input terminal of the comparator 56 is supplied with a voltage $SPx_h$ in which the phase voltage SPx is increased by a predetermined value by the switching element 52b when the switch 55d becomes conductive, and is supplied with a voltage $SPx_h+Vh2$ (Vh2 is a voltage generated when current flows in the resistor 53c) when the switch 55c becomes conductive.

The switches (55a to 55d) are controlled so that the comparator 56 has an appropriate hysteresis. Note that the structure for securing the hysteresis is not limited to the structure described above, and may be omitted in a certain case. An output terminal of the comparator 56 outputs a signal corresponding to a result of the comparison between the phase voltage SPx and the ground voltage GND as the signal DRx indicating the current direction in the x-phase.

Figure 9:
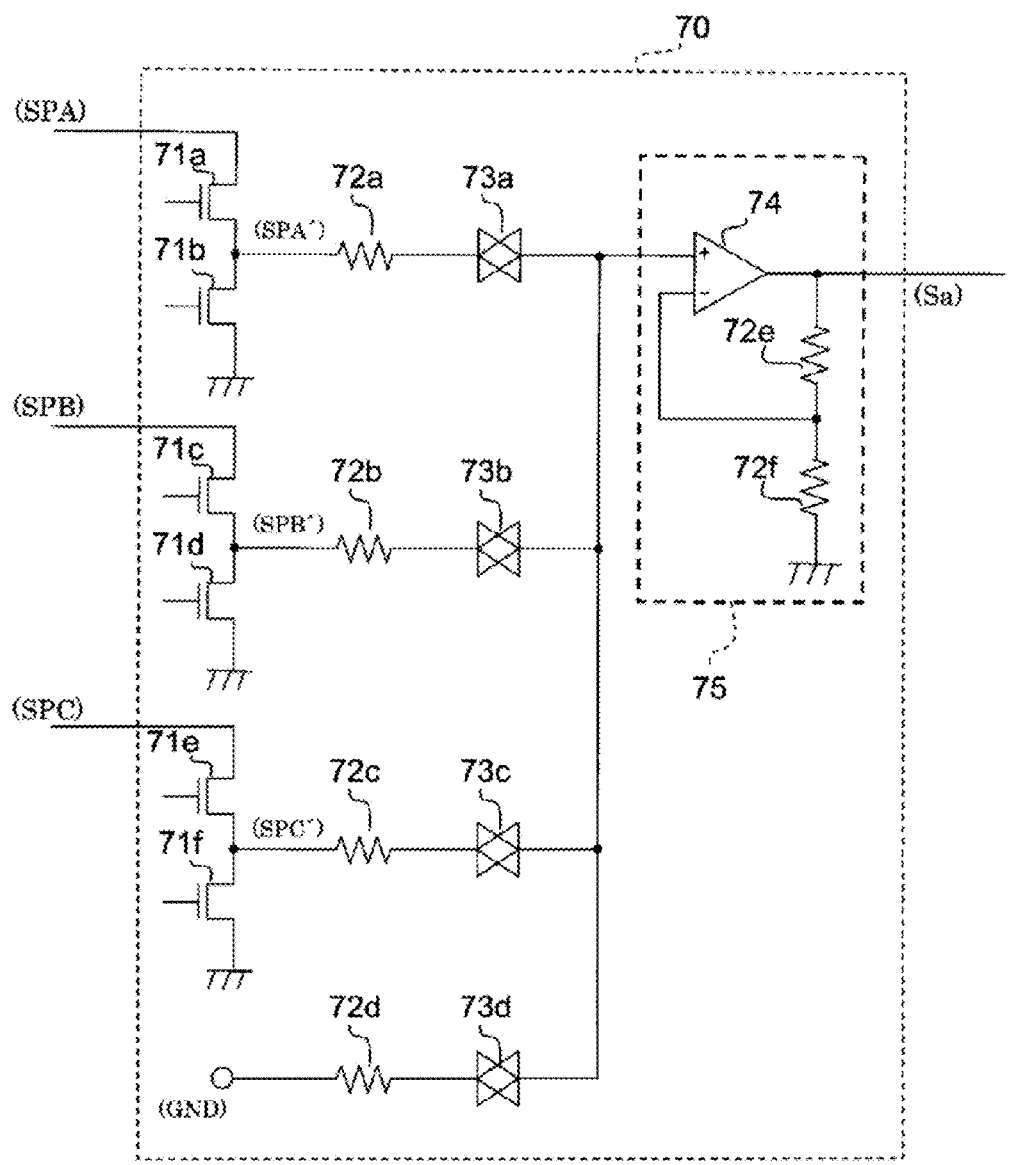
FIG. 9 is a structural diagram of an adder circuit according to this embodiment.

FIG. 9 is a structural diagram of the adder circuit 70. As illustrated in this diagram, the adder circuit 70 includes switching elements 71a to 71f (N-channel MOS field-effect transistors), resistors 72a to 72f, switches 73a to 73d, and an operational amplifier 74. Note that the resisters (72a to 72f) have the same resistance value (for example, 100 kΩ).

The switching element 71a has a drain supplied with the phase voltage SPA and a source connected to the ground via the switching element 71b. In addition, one end of the resistor 72a is connected to a node between the switching element 71a and the switching element 71b. The other end of the resistor 72a is connected to one end of the switch 73a.

Gates of the switching elements (71a and 71b) are supplied with an H level signal in a case where the adder circuit 70 should be operated and are supplied with a L level signal in the other case. When a gate of each of the switching elements (71a and 71b) is supplied with an H level signal, a voltage SPA' corresponding to the phase voltage SPA is supplied to the resistor 72a. A value of the voltage SPA' may be the same as the phase voltage SPA or may be a voltage divided by the switching elements (71a and 71b).

The switching element 71c has a drain supplied with the phase voltage SPB and a source connected to the ground via the switching element 71d. In addition, one end of the resistor 72b is connected to a node between the switching element 71c and the switching element 71d. The other end of the resistor 72b is connected to one end of the switch 73b.

A gate of each of the switching elements (71c and 71d) is supplied with an H level signal in a case where the adder circuit 70 should be operated and is supplied with a L level signal in the other case. When a gate of each of the switching elements (71c and 71d) is supplied with an H level signal, a voltage SPB' corresponding to the phase voltage SPB is supplied to the resistor 72b. A value of the voltage SPB' may be the same as the phase voltage SPB or may be a value divided by the switching elements (71c and 71d).

The switching element 71e has a drain supplied with the phase voltage SPC and a source connected to the ground via the switching element 71f. In addition, one end of the resistor 72c is connected to a node between the switching element 71e and the switching element 71f. The other end of the resistor 72c is connected to one end of the switch 73c.

A gate of each of the switching elements (71e and 71f) is supplied with an H level signal in a case where the adder circuit 70 should be operated and is supplied with a L level signal in the other case. When a gate of each of the switching elements (71e and 71f) is supplied with an H level signal, a voltage SPC' corresponding to the phase voltage SPC is supplied to the resistor 72c. A value of the voltage SPC' may be the same as the phase voltage SPC or may be a value divided by the switching elements (71e and 71f). Note that a dividing circuit including the switching element (71a to 71f) is disposed so that a circuit in a later stage can be formed of a low withstand voltage element. If such a consideration is not necessary, the phase voltage SPx may be applied as it is to the resistors (72a to 72c).

One end of the resistor 72d is supplied with the ground voltage GND, and the other end is connected to the switch 73d. In addition, the other ends of the switches (73a to 73d) are connected to a common line connected to a noninverting input terminal of the operational amplifier 74. Note that an output terminal of the operational amplifier 74 is connected to the ground via the resistor 72e and the resistor 72f, and an inverting input terminal of the operational amplifier 74 is connected to a node between the resistor 72e and the resistor 72f. In this way, the operational amplifier 74 and the resistors (72e and 72f) form a noninverting amplifying circuit 75 having a predetermined voltage amplification degree (here, two times), and the voltage signal Sa is output from the output terminal of the operational amplifier 74.

Here, in a circumstance where the A-phase is the maximum current phase and is the first pattern (namely, in a circumstance where DRA, DRB, and DRC are L, H, and H levels, respectively), the switch control circuit 60 turns on the switch 73a and the switch 73d, and turns off the other switches (73b and 73c). Thus, a voltage of the voltage signal Sa becomes the voltage SPA'. The voltage signal Sa in this case indicates a result of the detection of the current value in the A-phase.

In addition, in a circumstance where the A-phase is the maximum current phase and is the second pattern (namely, in a circumstance where DRA, DRB, and DRC are H, L, and L levels, respectively), the switch control circuit 60 turns on the switch 73b and the switch 73c, and turns off the other switches (73a and 73d). Thus, the voltage of the voltage signal Sa becomes the voltage SPB' plus voltage SPC'. The voltage signal Sa in this case indicates a result of adding current values in phases other than the A-phase.

In addition, in a circumstance where the B-phase is the maximum current phase and is the first pattern (namely, in a circumstance where DRA, DRB, and DRC are H, L, and H levels, respectively), the switch control circuit 60 turns on the switch 73b and the switch 73d, and turns off the other switches (73a and 73c). Thus, the voltage of the voltage signal Sa becomes the voltage SPB'. The voltage signal Sa in this case indicates a result of the detection of the current value in the B-phase.

In addition, in a circumstance where the B-phase is the maximum current phase and is the second pattern (namely, in a circumstance where DRA, DRB, and DRC are L, H, and L levels, respectively), the switch control circuit 60 turns on the switch 73a and the switch 73c, and turns off the other switches (73b and 73d). Thus, the voltage of the voltage signal Sa becomes the voltage SPA' plus the voltage SPC'. The voltage signal Sa in this case indicates a result of adding current values in phases other than the B-phase.

In addition, in a circumstance where the C-phase is the maximum current phase and is the first pattern (namely, in a circumstance where DRA, DRB, and DRC are H, H, and L levels, respectively), the switch control circuit 60 turns on the switch 73c and the switch 73d, and turns off other switches (73a and 73b). Thus, the voltage of the voltage signal Sa becomes the voltage SPC'. The voltage signal Sa in this case indicates a result of the detection of the current value in the C-phase.

In addition, in a circumstance where the C-phase is the maximum current phase and is the second pattern (namely, in a circumstance where DRA, DRB, and DRC are L, L, and H levels, respectively), the switch control circuit 60 turns on the switch 73a and the switch 73b, and turns off other switches (73c and 73d). Thus, the voltage of the voltage signal Sa becomes the voltage SPA' plus the voltage SPB'. The voltage signal Sa in this case becomes a result of adding current values in phases other than the C-phase. As described above, in each case, the voltage signal Sa indicates a result of the detection of the maximum current value.

Figure 10:
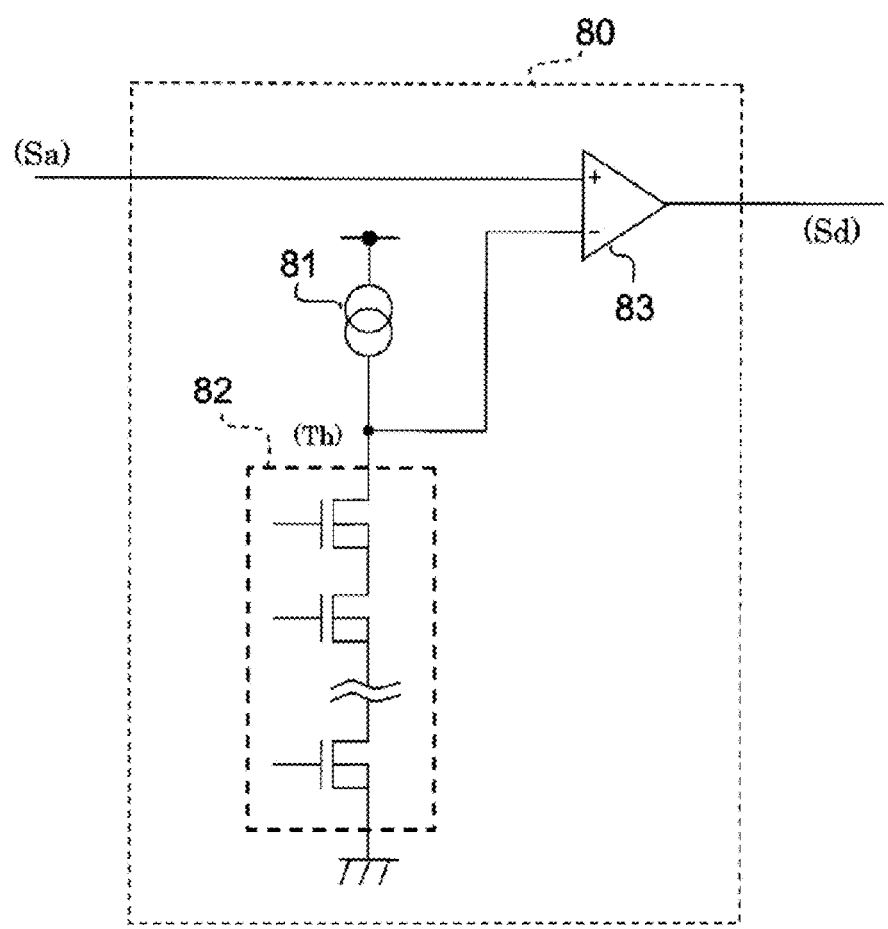
FIG. 10 is a structural diagram of a comparing circuit according to this embodiment.

FIG. 10 is a structural diagram of the comparing circuit 80. As illustrated in this diagram, the comparing circuit 80 includes a constant current source 81, a switch serial connection circuit 82, and a comparator 83. The constant current source 81 is connected to the ground via the switch serial connection circuit 82. In addition, the comparator 83 has an inverting input terminal connected to a node between the constant current source 81 and the switch serial connection circuit 82, and a noninverting input terminal supplied with the voltage signal Sa.

In addition, the switch serial connection circuit 82 has a structure in which a predetermined number of N-channel MOS field-effect transistors are connected in series, for example, so that the voltage signal corresponding to the threshold value Th described above is supplied to an inverting input terminal of the comparator 83. Thus, the signal Sd indicating whether or not the maximum current value has exceeded the threshold value Th is output from an output terminal of the comparator 83. Note that because the switch serial connection circuit 82 is constituted of N-channel MOS field-effect transistors formed in the same process as the lower switch 12x, variations or the like of electric characteristics of the switching elements (71a to 71f) due to temperature variation or the like can be canceled.

As described above, the current detector 21 (current detection circuit) is a circuit for detecting the maximum current value in the spindle motor 2. In addition, the current detector 21 includes a functional part (identifier) of identifying the maximum current phase having the maximum current value among phases of the spindle motor 2 and a functional part (detector) of detecting the maximum current value by adding current values in phases other than the maximum current phase when the current direction in the maximum current phase is a predetermined first direction (that is a direction from the spindle motor drive unit 10 to the spindle motor 2). Note that in the current detector 21, the current direction detection circuit 50x mainly corresponds to the above-mentioned identifier. In addition, the switch control circuit 60 and the adder circuit 70 mainly correspond to the above-mentioned detector.

In addition, when the current direction in the maximum current phase is a second direction opposite to the first direction (that is a direction from the spindle motor 2 to the spindle motor drive unit 10), the above-mentioned detector detects the current value in the maximum current phase as it is as the maximum current value.

In addition, the above-mentioned identifier includes the current direction detection circuit 50x for detecting the current direction for each phase of the spindle motor 2, and identifies a phase having a current direction different from other two phases among the phases of the spindle motor 2 as the maximum current phase. In addition, the current direction detection circuit 50x includes the comparator 56 for comparing the voltage of each phase of the spindle motor 2 with the ground voltage GND, and the identifier detects the current direction of each phase of the spindle motor 2 based on an output of the comparator 56.

Here, the spindle motor drive unit 10 of the first embodiment is provided with six comparators (13x and 14x) for comparing the phase voltage SPx with the voltage VPWR or the ground voltage GND. However, when many comparators are disposed in this way, there occurs a problem that downsizing of the motor driving device 1 is disturbed or that manufacturing cost is increased. In view of this problem, an embodiment in which the comparators are reduced is described below as a second embodiment.

2. Second Embodiment

Next, the second embodiment is described. Note that a part different from the first embodiment is mainly described, and overlapping description may be omitted.

Figure 11:
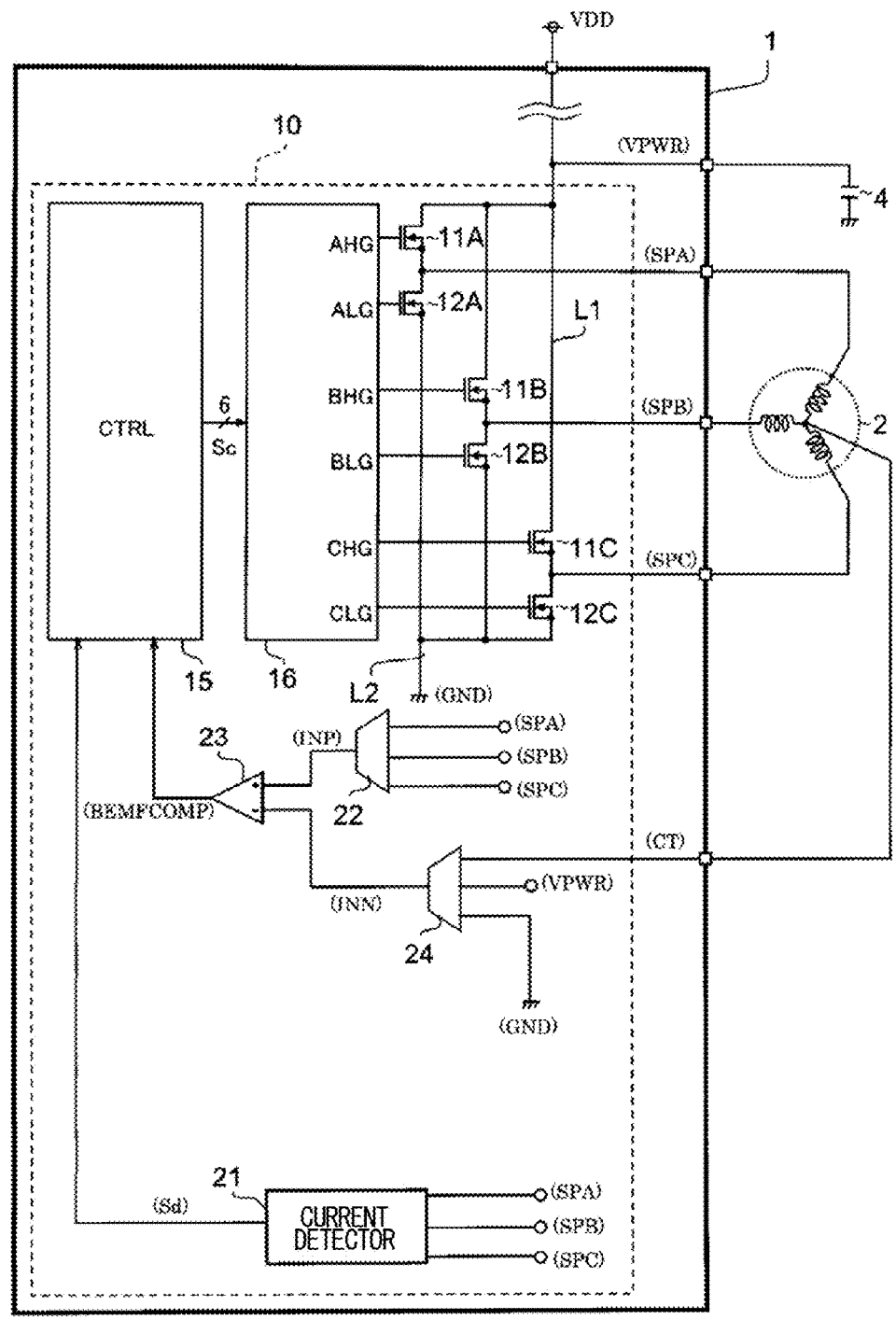
FIG. 11 is a structural diagram of a motor driving device and its peripherals according to a second embodiment.

FIG. 11 is a structural diagram of the motor driving device 1 and its peripherals. Note that FIG. 11 illustrates a part of the spindle motor drive unit 10 in detail, and illustration of other parts is omitted partially.

As illustrated in FIG. 11, the spindle motor drive unit 10 includes the power supply line L1, the ground line L2, the upper switch 11x, the lower switch 12x, the control unit 15, the predriver unit 16, the current detector 21, the selection circuit 22, the BEMF comparator 23, and a selection circuit 24. Note that the second embodiment is different from the first embodiment in that the upper comparator 13x and the lower comparator 14x are not mounted.

The selection circuit 22 is supplied with all the phase voltages (SPA to SPC). The selection circuit 22 selects one of these input voltages and outputs the selected one as a voltage signal INP to the noninverting input terminal of the BEMF comparator 23.

In addition, the selection circuit 24 is supplied with the voltage VPWR, the voltage CT, and the voltage GND. The selection circuit 24 selects one of these input voltages and outputs it as a voltage signal INN to the inverting input terminal of the BEMF comparator 23.

Note that the input voltages selected by the selection circuits (22 and 24) are determined depending on eight states of "0" to "7" in the spindle motor drive unit 10 (hereinafter referred to as "SRSTATE").

Specifically, if SRSTATE is "0", the selection circuit 22 selects "phase voltage SPA" while the selection circuit 24 selects "voltage CT". In addition, if SRSTATE is "1", the selection circuit 22 selects "phase voltage SPC" while the selection circuit 24 selects "voltage GND".

In addition, if SRSTATE is "2", the selection circuit 22 selects "phase voltage SPB" while the selection circuit 24 selects "voltage VPWR". In addition, if SRSTATE is "3", the selection circuit 22 selects "phase voltage SPA" while the selection circuit 24 selects "voltage GND".

In addition, if SRSTATE is "4", the selection circuit 22 selects "phase voltage SPC" while the selection circuit 24 selects "voltage VPWR". In addition, if SRSTATE is "5", the selection circuit 22 selects "phase voltage SPB" while the selection circuit 24 selects "voltage GND".

In addition, if SRSTATE is "6", the selection circuit 22 selects "phase voltage SPA" while the selection circuit 24 selects "voltage VPWR". In addition, if SRSTATE is "7", the selection circuit 22 selects "phase voltage SPA" while the selection circuit 24 selects "voltage CT".

The BEMF comparator 23 compares the signal INP supplied from the selection circuit 22 with the signal voltage supplied from the selection circuit 24, and outputs a pulse signal indicating a result of the comparison as a signal BEMFCOMP to the control unit 15. Note that in the following description, the signal BEMFCOMP when the signal INP is larger than the signal INN is set to "1" (high level), and the signal BEMFCOMP when the signal INP is smaller than the signal INN is set to "0" (low level). Note that the BEMF comparator 23 of the second embodiment is used for detecting the rotation speed of the spindle motor 2 and is also used for switching the operation mode in the spindle motor drive unit 10.

Figure 12:
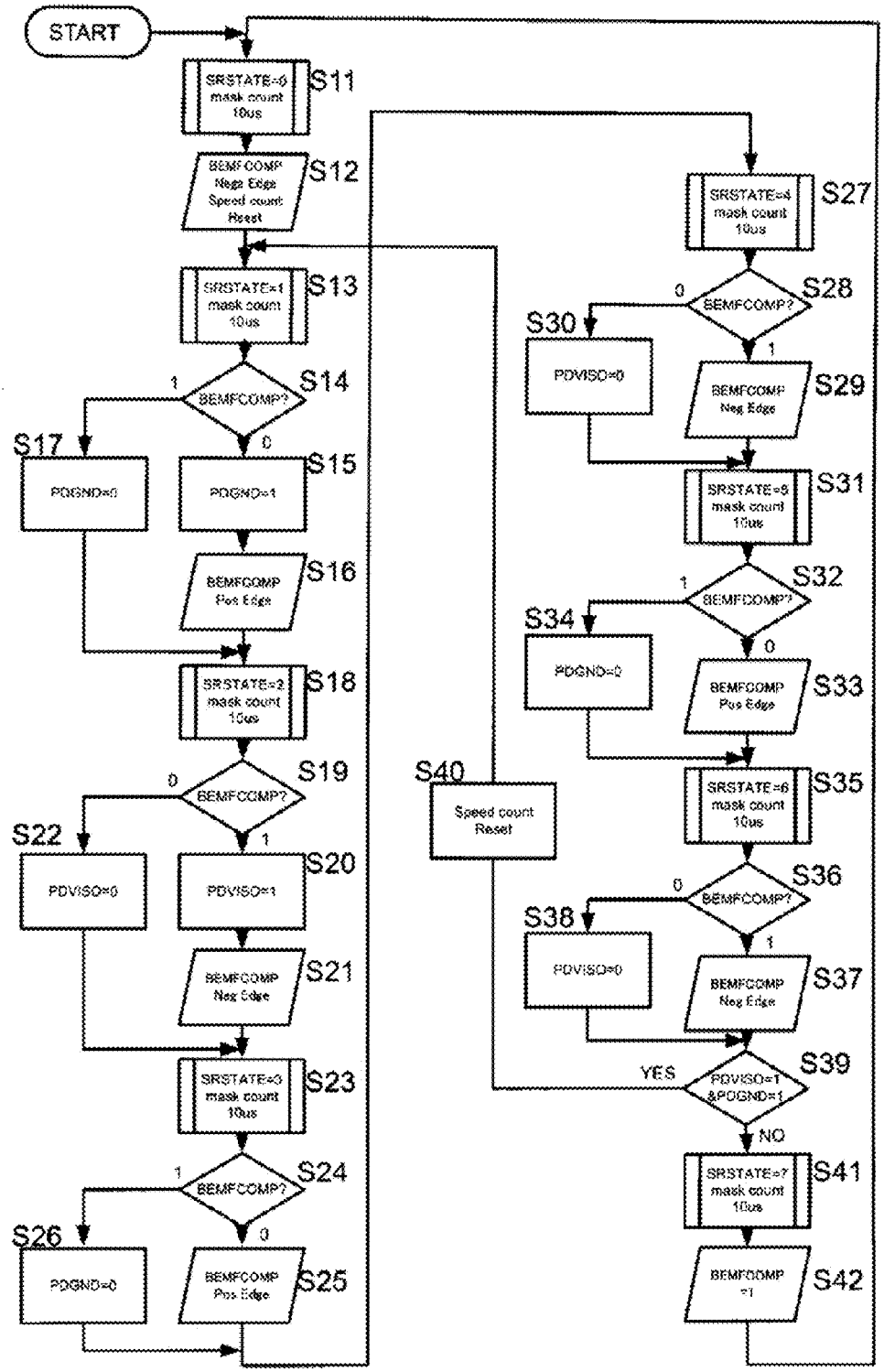
FIG. 12 is a flowchart of an operation in motor brake according to the second embodiment.

Next, the operation of the spindle motor drive unit 10 in motor brake is described with reference to a flowchart illustrated in FIG. 12. Note that FIG. 12 illustrates an example of a flow of an operation in the coast mode from a state in which the signal BEMFCOMP is "1" and SRSTATE is "0". Note that "PDGND" and "PDVISO" in the following description are updatable parameters and are set to "0" or "1" respectively.

When SRSTATE becomes "0" (a state where "phase voltage SPA" and "voltage CT" is compared), the control unit 15 counts a predetermined masking time (10 μs as an example in this embodiment, and the same is true in the following description) (Step S11). The signal BEMFCOMP just after the level has changed is stabilized before this masking time elapses. In addition, the control unit 15 resets a speed count in accordance with rising of the signal BEMFCOMP after the masking time is counted (Step S12).

This speed count is a time count for detecting the rotation speed of the spindle motor 2. In other words, the control unit 15 newly performs the speed count every time when the speed count is reset until next reset. As the time of the speed count of one time is longer, it can be said that the rotation speed of the spindle motor 2 becomes slower. When a result of the speed count reaches a predetermined reference value (when the rotation speed of the spindle motor 2 is sufficiently decreased), the control unit 15 stops to control the switches (11x and 12x), for example, similarly to the case of the first embodiment.

In addition, when the speed count is reset (Step S12), SRSTATE is switched to "1" (a state in which "phase voltage SPC" and "voltage GND" are compared). When SRSTATE is switched to "1", the control unit 15 counts the masking time (Step S13). In addition, the control unit 15 determines a state of the signal BEMFCOMP at a time point after the masking time is counted (Step S14).

If the signal BEMFCOMP is "0" ("0" in Step S14), PDGND is set to "1" (Step S15). After that, in accordance with falling of the signal BEMFCOMP (Step S16), SRSTATE is switched to "2" (a state in which "phase voltage SPB" and "voltage VPWR" are compared). On the other hand, if the signal BEMFCOMP is "1" ("1" in Step S14), PDGND is set to "0" (Step S17), and SRSTATE is switched to "2".

When SRSTATE is switched to "2", the control unit 15 counts the masking time (Step S18). In addition, the control unit 15 determines a state of the signal BEMFCOMP at a time point after the masking time is counted (Step S19).

When the signal BEMFCOMP is "1" ("1" in Step S19), PDVISO is set to "1" (Step S20). After that, in accordance with falling of the signal BEMFCOMP (Step S21), SRSTATE is switched to "3" (a state in which "phase voltage SPA" and "voltage GND" are compared). On the other hand, when the signal BEMFCOMP is "0" ("0" in Step S19), PDVISO is set to "0" (Step S22), and SRSTATE is switched to "3".

When SRSTATE is switched to "3", the control unit 15 counts the masking time (Step S23). In addition, the control unit 15 determines a state of the signal BEMFCOMP at a time point after the masking time is counted (Step S24).

When the signal BEMFCOMP is "0" ("0" in Step S24), in accordance with rising of the signal BEMFCOMP (Step S25), SRSTATE is switched to "4" (a state in which "phase voltage SPC" and "voltage VPWR" are compared). On the other hand, when the signal BEMFCOMP is "1" ("1" in Step S24), PDGND is set to "0" (Step S26), and SRSTATE is switched to "4".

When SRSTATE is switched to "4", the control unit 15 counts the masking time (Step S27). In addition, the control unit 15 determines a state of the signal BEMFCOMP at a time point after the masking time is counted (Step S28).

When the signal BEMFCOMP is "1" ("1" in Step S28), in accordance with falling of the signal BEMFCOMP (Step S29), SRSTATE is switched to "5" (a state in which "phase voltage SPB" and "voltage GND" are compared). On the other hand, when the signal BEMFCOMP is "0" ("0" in Step S28), PDVISO is set to "0" (Step S30), and SRSTATE is switched to "5".

When SRSTATE is switched to "5", the control unit 15 counts the masking time (Step S31). In addition, the control unit 15 determines a state of the signal BEMFCOMP at a time point after the masking time is counted (Step S32).

When the signal BEMFCOMP is "0" ("0" in Step S32), in accordance with rising of the signal BEMFCOMP (Step S33), SRSTATE is switched to "6" (a state in which "phase voltage SPA" and "voltage VPWR" are compared). On the other hand, when the signal BEMFCOMP is "1" ("1" in Step S32), PDGND is set to "0" (Step S34), and SRSTATE is switched to "6".

When SRSTATE is switched to "6", the control unit 15 counts the masking time (Step S35). In addition, the control unit 15 determines a state of the signal BEMFCOMP at a time point after the masking time is counted (Step S36).

When the signal BEMFCOMP is "1" ("1" in Step S36), in accordance with falling of the signal BEMFCOMP (Step S37), the control unit 15 determines whether or not the condition of "PDVISO=1 and PDGND=1" is satisfied (Step S39). Note that when the signal BEMFCOMP is "0" ("0" in Step S36), this determination is performed after PDVISO is set to "0" (Step S38).

If the condition of "PDVISO=1 and PDGND=1" is satisfied (YES in Step S39), the speed count is reset (Step S40), SRSTATE is switched to "1", and the operation flow returns to Step S13. On the other hand, if the condition is not satisfied (NO in Step S39), SRSTATE is switched to "7" (a state in which "phase voltage SPA" and "voltage CT" are compared).

When SRSTATE is switched to "7", the control unit 15 counts the masking time (Step S41). After the masking time is counted, when the condition that the signal BEMFCOMP is "1" is satisfied (Step S42), SRSTATE is switched to "0", the process flow returns to Step S11.

Note that while the above-mentioned series of operations is being performed, if the condition of "PDVISO=1 and PDGND=1" is satisfied in the coast mode, the operation mode of the spindle motor drive unit 10 proceeds to the synchronous rectifying mode. On the other hand, in the control unit 15, if the condition of "PDVISO=0 or PDGND=0" is satisfied in the synchronous rectifying mode, the operation mode of the spindle motor drive unit 10 proceeds to the coast mode.

In addition, in the synchronous rectifying mode, the ON/OFF switching of the upper switching element 11x and the lower switching element 12x is controlled by the control unit 15 so that the synchronous rectifying operation is performed.

More specifically, if SRSTATE is "1", the upper gate signal BHG and the lower gate signal CLG are set to high level, and other gate signals are set to low level. In addition, if SRSTATE is "2", the upper gate signal BHG and the lower gate signal ALG are set to high level, and other gate signals are set to low level.

In addition, if SRSTATE is "3", the upper gate signal CHG and the lower gate signal ALG are set to high level, and other gate signals are set to low level. In addition, if SRSTATE is "4", the upper gate signal CHG and the lower gate signal BLG are set to high level, and other gate signals are set to low level.

In addition, if SRSTATE is "5", the upper gate signal AHG and the lower gate signal BLG are set to high level, and other gate signals are set to low level. In addition, if SRSTATE is "6", the upper gate signal AHG and the lower gate signal CLG are set to high level, and other gate signals are set to low level. When the switches (11x and 12x) are controlled in this way, in the second embodiment too, basically the same synchronous rectifying operation as in the first embodiment is realized.

Figure 13:
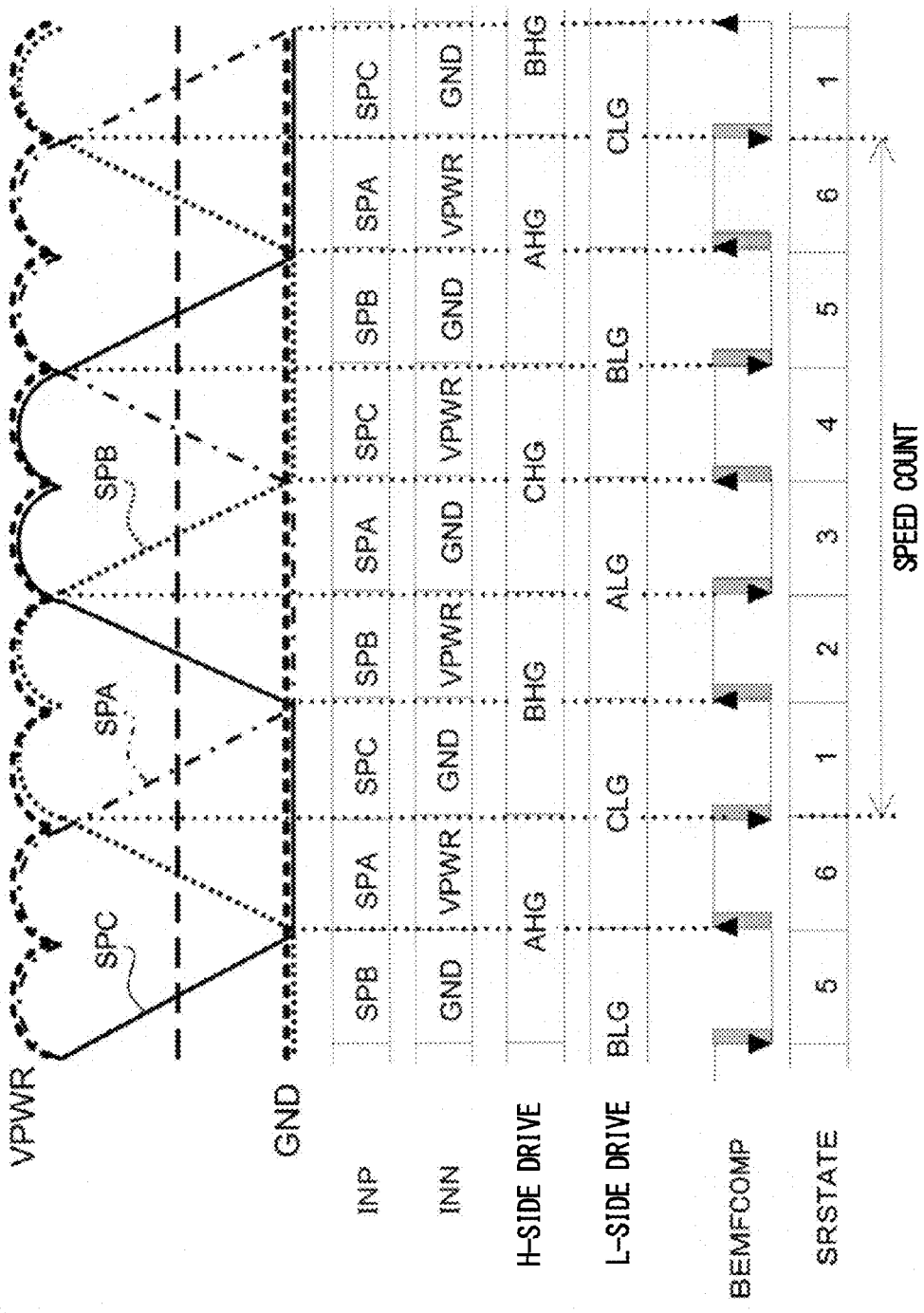
FIG. 13 is an explanatory diagram of changes of signals and the like in a synchronous rectifying mode.

FIG. 13 illustrates an example of variations of the phase voltage SPx, the voltage VPWR, the voltage GND, the signal INP, the signal INN, an H-side drive, an L-side drive, the signal BEMFCOMP, and SRSTATE in the synchronous rectifying mode. Note that the "H-side drive" indicates the upper gate signal xHG to be high level, and the "L-side drive" indicates the lower gate signal xLG to be high level. In addition, colored parts of the signal BEMFCOMP in the chart indicate the masking time (the same is true in the following charts).

In the synchronous rectifying mode, the signal INP, the signal INN, the H-side drive, and the L-side drive are switched by a predetermined pattern as illustrated in FIG. 13. In this way, the BEMF comparator 23 of the second embodiment also plays roles of the upper comparator 13x and the lower comparator 14x in the first embodiment. Therefore, in the second embodiment, although these comparators (13x and 14x) are eliminated, the synchronous rectifying operation can be realized. In addition, in the synchronous rectifying mode, the speed count is reset at the timing when the SRSTATE is switched from "6" to "1".

Figure 14:
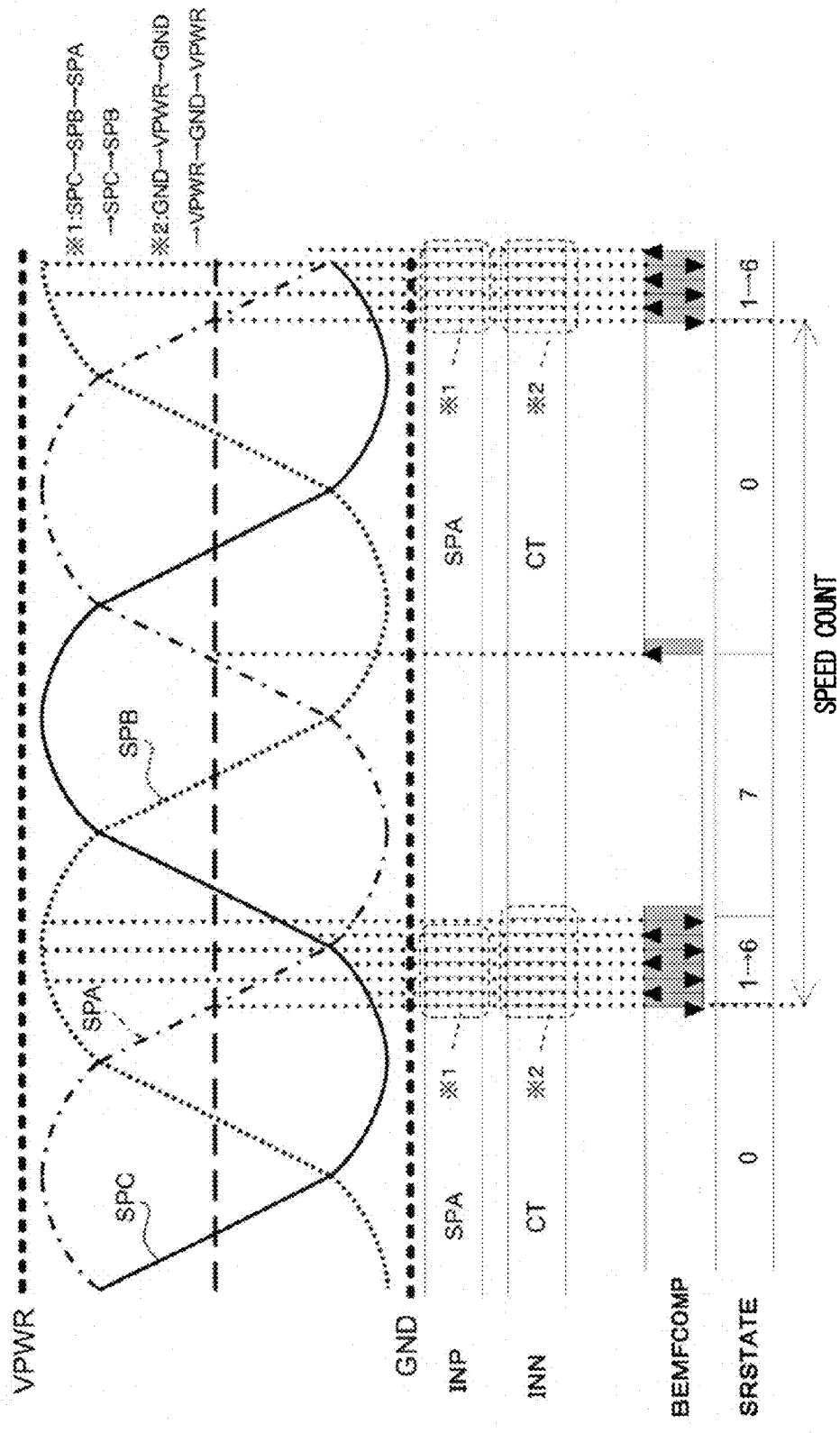
FIG. 14 is an explanatory diagram of changes of signals and the like in a coast mode.

In addition, FIG. 14 illustrates an example of variations of the phase voltage SPx, the voltage VPWR, the voltage GND, the signal INP, the signal INN, the signal BEMFCOMP, and the SRSTATE in the coast mode. Note that parts of ✕1 in the chart are parts of changing in order of SPC, SPB, SPA, SPC, and SPB, while parts of ✕2 are parts of changing in order of GND, VPWR, GND, VPWR, GND, and VPWR (the same is true in the following charts).

In the coast mode too, the signal INP and the signal INN are switched in accordance with a predetermined pattern as illustrated in FIG. 14. In addition, the speed count is reset at the timing when SRSTATE is switched from "0" to "1" in the coast mode.

Figure 15:
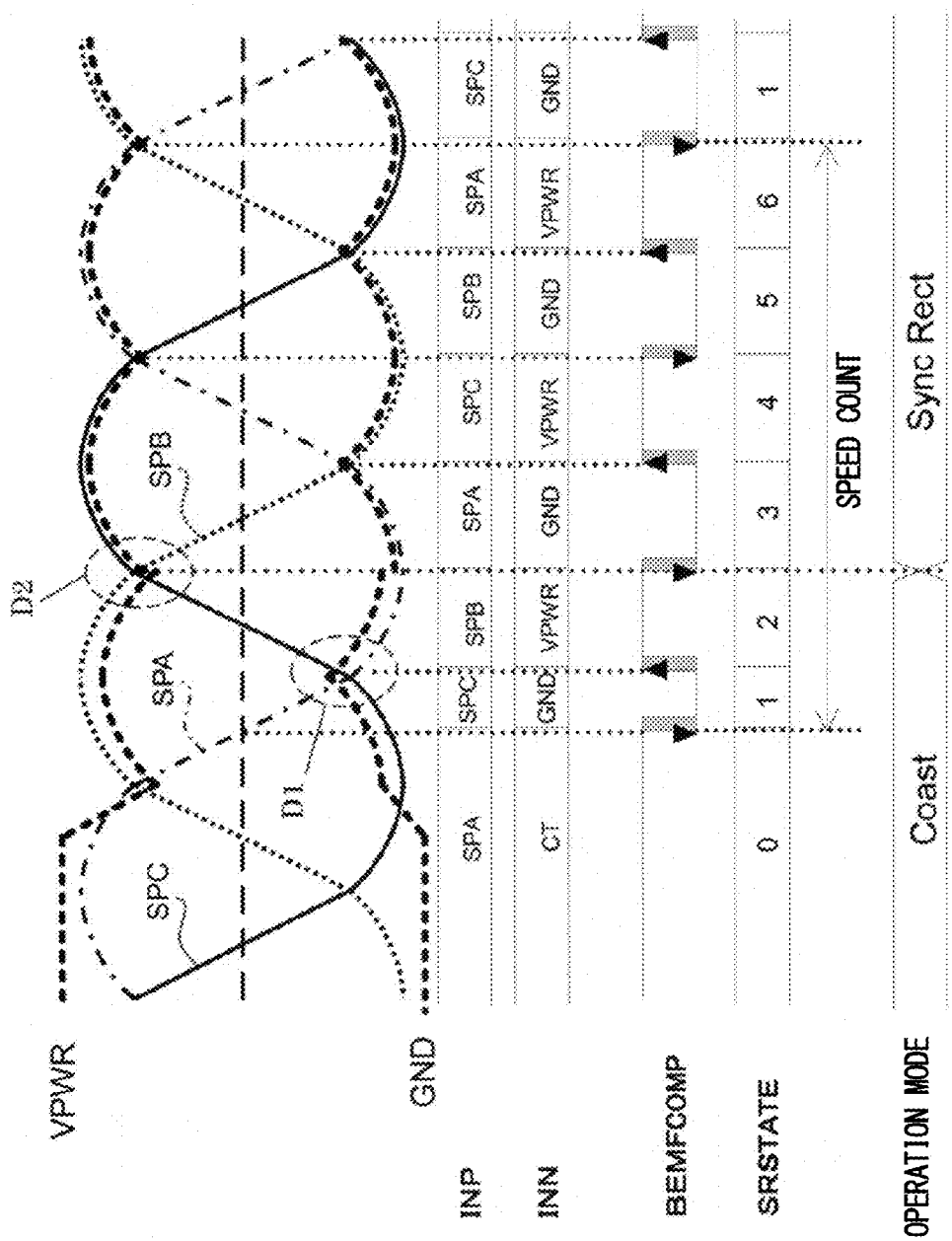
FIG. 15 is an explanatory diagram of changes of signals and the like when proceeding from the coast mode to the synchronous rectifying mode.

In addition, FIG. 15 illustrates an example of variations of the phase voltage SPx, the voltage VPWR, the voltage GND, the signal INP, the signal INN, the signal BEMFCOMP, SRSTATE, and the operation mode when proceeding from the coast mode to the synchronous rectifying mode.

In the example shown in this chart, when a state indicated by D1 (a state in which the phase voltage SPC is lower than the voltage GND) is detected, "PDGND=1" is satisfied. When a state indicated by D2 (a state in which the phase voltage SPB is higher than the voltage VPWR) is detected, "PDVISO=1" is satisfied. Thus, the condition of "PDVISO=1 and PDGND=1" is satisfied, and the operation mode of the spindle motor drive unit 10 proceeds to the synchronous rectifying mode.

Figure 16:
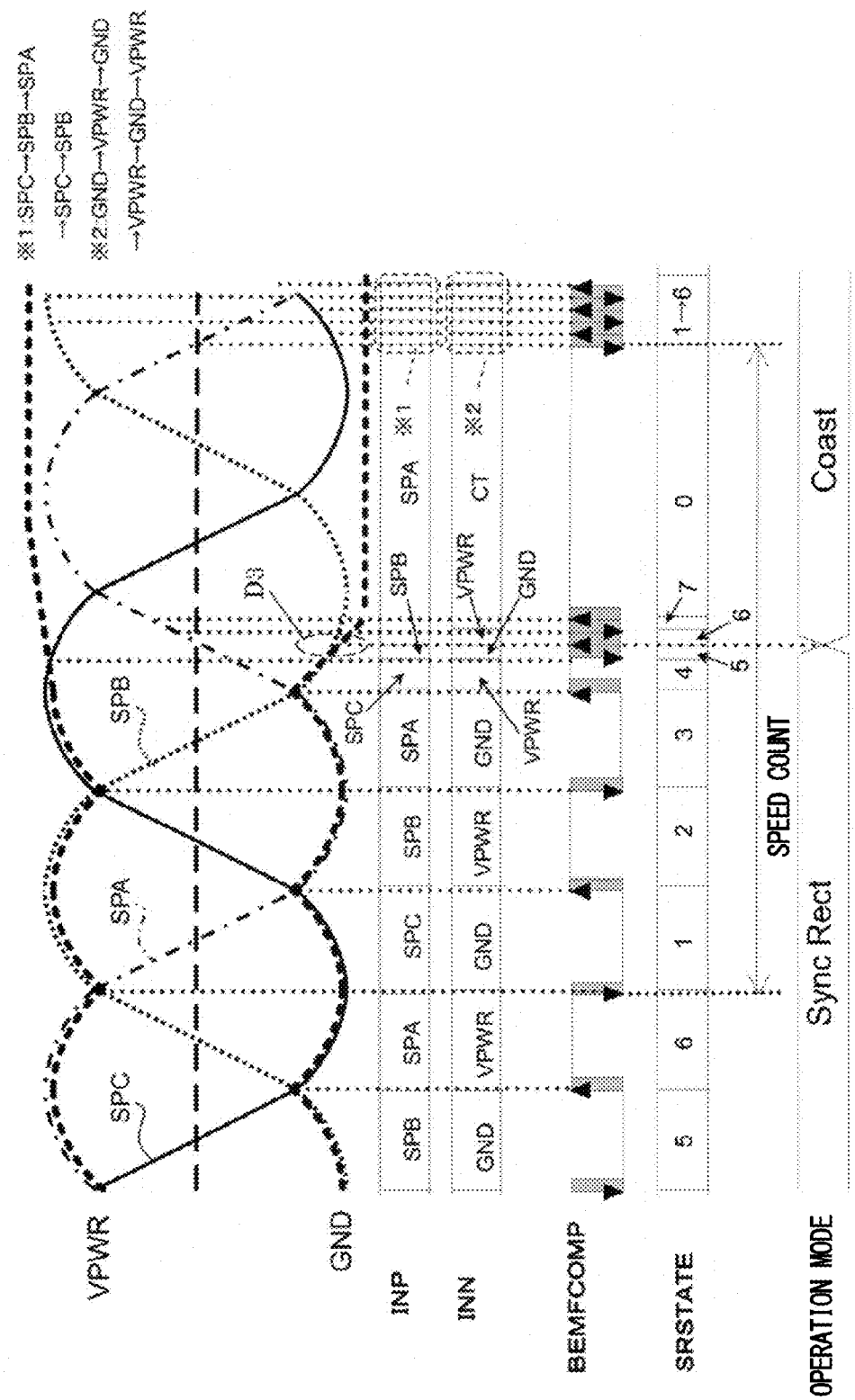
FIG. 16 is an explanatory diagram of changes of signals and the like when proceeding from the synchronous rectifying mode to the coast mode.

In addition, FIG. 16 illustrates an example of variations of the phase voltage SPx, the voltage VPWR, the voltage GND, the signal INP, the signal INN, the signal BEMFCOMP, SRSTATE, and the operation mode when proceeding from the synchronous rectifying mode to the coast mode.

In the example shown in this chart, when a state indicated by D3 (a state in which the phase voltage SPB is higher than the voltage GND) is detected, "PDGND=0" is satisfied. Thus, the condition of "PDVISO=0 or PDGND=0" is satisfied, and the operation mode of the spindle motor drive unit 10 proceeds to the coast mode.

Here, according to the second embodiment, it is possible to reduce the number of comparators largely compared with the first embodiment, but delay in switching the operation mode may become relatively large. This point is described below with reference to FIG. 17.

Figure 17:
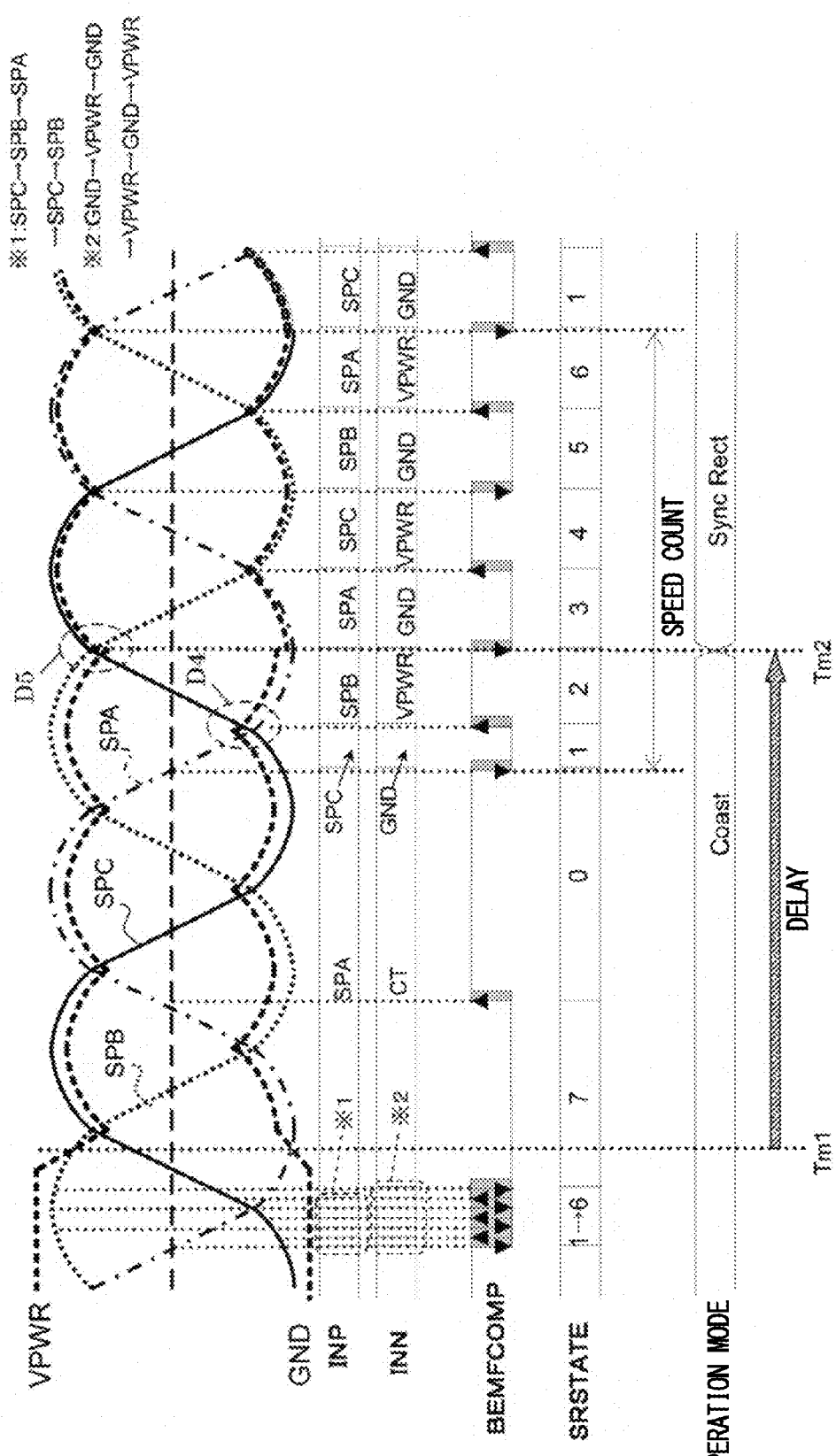
FIG. 17 is an explanatory diagram of a delay in switching operation modes according to the second embodiment.

FIG. 17 illustrates an example of variations of the phase voltage SPx, the voltage VPWR, the voltage GND, the signal INP, the signal INN, the signal BEMFCOMP, SRSTATE, and the operation mode when proceeding from the coast mode to the synchronous rectifying mode and when the delay in switching the operation mode becomes relatively large.

In the example illustrated in FIG. 17, it is ideal that the operation mode is switched to the synchronous rectifying mode at timing Tm1 (at which the drop of the voltage VPWR can be suppressed by the synchronous rectifying operation) due to decrease of the voltage VPWR in the coast mode.

However, in the case of the second embodiment, after the timing Tm1, "PDGND=1" is satisfied when a state indicated by D4 (a state in which the phase voltage SPC is lower than the voltage GND) is detected, and "PDVISO=1" is satisfied when a state indicated by D5 (a state in which the phase voltage SPB is higher than the voltage VPWR) is detected. At this time point (timing Tm2 illustrated in FIG. 17), the condition of "PDVISO=1 and PDGND=1" is satisfied, and the operation mode is switched to synchronous rectifying mode. As a result, as indicated by an arrow in a lower part of FIG. 17, the delay in switching the operation mode becomes relatively large.

In view of this problem, there is described an embodiment in which the number of comparators is reduced compared with the first embodiment while the delay in switching the operation mode is suppressed, as a third embodiment.

3. Third Embodiment

Next, the third embodiment is described. Note that in the description below, a part different from the second embodiment is mainly described, and overlapping description may be omitted.

Figure 18:
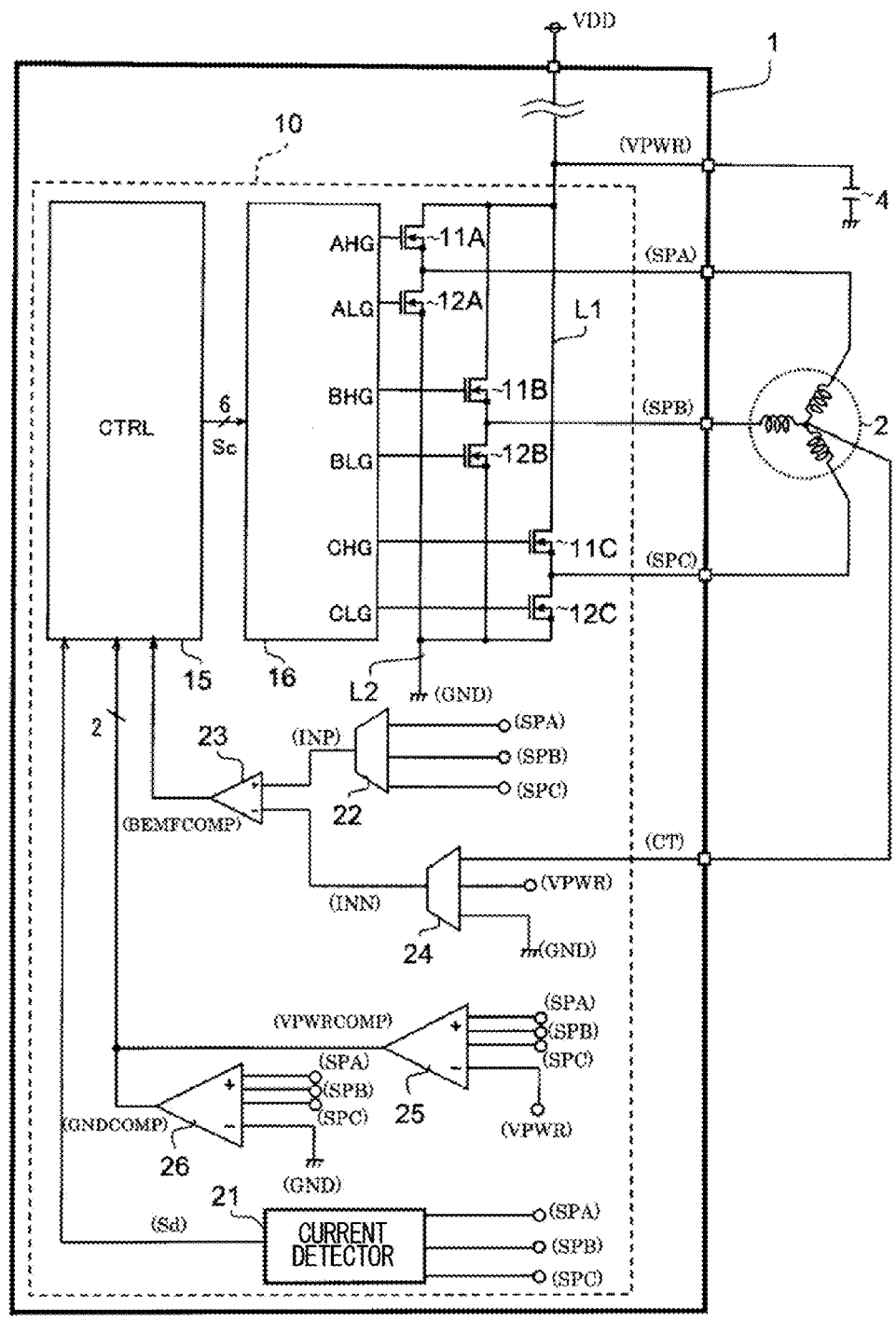
FIG. 18 is a structural diagram of a motor driving device and its peripherals according to a third embodiment.

FIG. 18 is a structural diagram of the motor driving device 1 and its peripherals. Note that FIG. 18 illustrates a part of the spindle motor drive unit 10 in detail, and illustration of other parts is omitted partially.

As illustrated in FIG. 18, the spindle motor drive unit 10 includes the power supply line L1, the ground line L2, the upper switch 11x, the lower switch 12x, the control unit 15, the predriver unit 16, the current detector 21, the selection circuit 22, the BEMF comparator 23, the selection circuit 24, a VPWR comparator 25, and a GND comparator 26.

The VPWR comparator 25 compares each of the phase voltages (SPA to SPC) supplied to the noninverting input terminal with the voltage VPWR supplied to the inverting input terminal, and outputs a pulse signal indicating a result of the comparison as a signal VPWRCOMP to the control unit 15. Note that in the following description, the signal VPWRCOMP is set to "1" when the voltage VPWR is smaller than one of the phase voltages (SPA to SPC), and otherwise the signal VPWRCOMP is set to "0".

The GND comparator 26 compares each of the phase voltages (SPA to SPC) supplied to the noninverting input terminal with the voltage GND supplied to the inverting input terminal, and outputs a pulse signal indicating a result of the comparison as a signal GNDCOMP to the control unit 15. Note that in the following description, the signal GNDCOMP is set to "0" when the voltage GND is larger than one of the phase voltages (SPA to SPC), and otherwise the signal GNDCOMP is set to "1".

Figure 19:
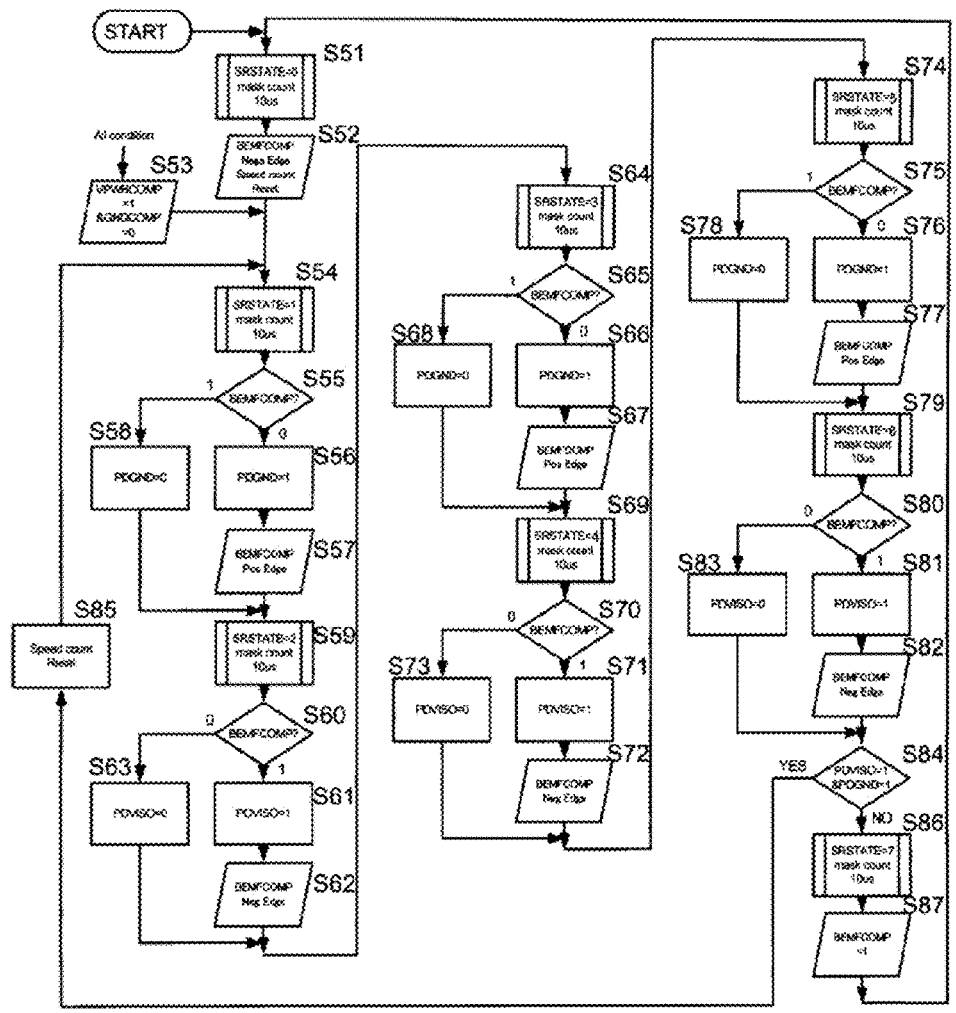
FIG. 19 is a flowchart of an operation in motor brake according to the third embodiment.

Next, the operation of the spindle motor drive unit 10 in motor brake is described with reference to a flowchart illustrated in FIG. 19. Note that FIG. 19 illustrates an example of a flow of an operation in the coast mode from a state in which the signal BEMFCOMP is "1" and SRSTATE is 0".

When SRSTATE becomes "0" (a state in which "phase voltage SPA" and "voltage CT" are compared), the control unit 15 counts the masking time (Step S51). In addition, after the masking time is counted, the control unit 15 resets the speed count in accordance with falling of the signal BEMFCOMP (Step S52). After that, SRSTATE is switched to "1" (a state in which "phase voltage SPC" and "voltage GND" are compared).

Note that if the condition of "VPWRCOMP=1 and GNDCOMP=0" is not satisfied, the operation mode of the spindle motor drive unit 10 is the coast mode. In this case, if the condition of "VPWRCOMP=1 and GNDCOMP=0" is satisfied (Step S53), SRSTATE becomes "1".

When SRSTATE is switched to "1", the control unit 15 counts the masking time (Step S54). In addition, the control unit 15 determines a state of the signal BEMFCOMP at a time point after the masking time is counted (Step S55).

When the signal BEMFCOMP is "0" ("0" in Step S55), PDGND is set to "1" (Step S56). After that, in accordance with rising of the signal BEMFCOMP (Step S57), SRSTATE is switched to "2" (a state in which "phase voltage SPB" and "voltage VPWR" are compared). On the other hand, when the signal BEMFCOMP is "1" ("1" in Step S55), PDGND is set to "0" (Step S58), and SRSTATE is switched to "2".

When SRSTATE is switched to "2", the control unit 15 counts the masking time (Step S59). In addition, the control unit 15 determines a state of the signal BEMFCOMP at a time point after the masking time is counted (Step S60).

When the signal BEMFCOMP is "1" ("1" in Step S60), PDVISO is set to "1" (Step S61). After that, in accordance with falling of the signal BEMFCOMP (Step S62), SRSTATE is switched to "3" (a state in which "phase voltage SPA" and "voltage GND" are compared). On the other hand, when the signal BEMFCOMP is "0" ("0" in Step S60), PDVISO is set to "0" (Step S63), and SRSTATE is switched to "3".

When SRSTATE is switched to "3", the control unit 15 counts the masking time (Step S64). In addition, the control unit 15 determines a state of the signal BEMFCOMP at a time point after the masking time is counted (Step S65).

When the signal BEMFCOMP is "0" ("0" in Step S65), PDGND is set to "1" (Step S66). After that, in accordance with rising of the signal BEMFCOMP (Step S67), SRSTATE is switched to "4" (a state in which "phase voltage SPC" and "voltage VPWR" are compared). On the other hand, when the signal BEMFCOMP is "1" ("1" in Step S65), PDGND is set to "0" (Step S68), and SRSTATE is switched to "4".

When SRSTATE is switched to "4", the control unit 15 counts the masking time (Step S69). In addition, the control unit 15 determines a state of the signal BEMFCOMP at a time point after the masking time is counted (Step S70).

When the signal BEMFCOMP is "1" ("1" in Step S70), PDVISO is set to "1" (Step S71). After that, in accordance with falling of the signal BEMFCOMP (Step S72), SRSTATE is switched to "5" (a state in which "phase voltage SPB" and "voltage GND" are compared). On the other hand, when the signal BEMFCOMP is "0" ("0" in Step S70), PDVISO is set to "0" (Step S73), and SRSTATE is switched to "5".

When SRSTATE is switched to "5", the control unit 15 counts the masking time (Step S74). In addition, the control unit 15 determines a state of the signal BEMFCOMP at a time point after the masking time is counted (Step S75).

When the signal BEMFCOMP is "0" ("0" in Step S75), PDGND is set to "1" (Step S76). After that, in accordance with rising of the signal BEMFCOMP (Step S77), SRSTATE is switched to "6" (a state in which "phase voltage SPA" and "voltage VPWR" are compared). On the other hand, when the signal BEMFCOMP is "1" ("1" in Step S75), PDGND is set to "0" (Step S78), and SRSTATE is switched to "6".

When SRSTATE is switched to "6", the control unit 15 counts the masking time (Step S79). In addition, the control unit 15 determines a state of the signal BEMFCOMP at a time point after the masking time is counted (Step S80).

When the signal BEMFCOMP is "1" ("1" in Step S80), PDVISO is set to "1" (Step S81). Then, in accordance with falling of the signal BEMFCOMP (Step S82), the control unit 15 determines whether or not the condition of "PDVISO=1 and PDGND=1" is satisfied (Step S84). Note that if the signal BEMFCOMP is "0" ("0" in Step S80), this determination is performed after PDVISO is set to "0" (Step S83).

If the condition of "PDVISO=1 and PDGND=1" is satisfied (YES in Step S84), SRSTATE is switched to "1", and the operation flow returns to Step S54 after the speed count is reset (Step S85). On the other hand, if the condition is not satisfied (NO in Step S84), SRSTATE is switched to "7" (a state in which "phase voltage SPA" and "voltage CT" are compared).

When SRSTATE is switched to "7", the control unit 15 counts the masking time (Step S86). After the masking time is counted, when the condition that the signal BEMFCOMP is "1" is satisfied (Step S87), SRSTATE is switched to "0", and the process flow returns to Step S51.

Note that in the coast mode, when the condition of "VPWRCOMP=1 and GNDCOMP=0" is satisfied (Step S53), and afterward when the condition of "PDVISO=1" is further satisfied while the above-mentioned condition is still satisfied, upper side output (High side) synchronous rectifying is started. In addition, in the coast mode, if the condition of "VPWRCOMP=1 and GNDCOMP=0" is satisfied (Step S53), and afterward when the condition of "PDGND=1" is further satisfied while the above-mentioned condition is still satisfied, lower side output (Low side) synchronous rectifying is started.

When the upper side output synchronous rectifying is started, the upper switch 11$x$ performs the same ON/OFF switching as in the synchronous rectifying operation. In addition, when the lower side output synchronous rectifying is started, the lower switch 12$x$ performs the same ON/OFF switching as in the synchronous rectifying operation.

When both the upper side output synchronous rectifying and the lower side output synchronous rectifying are started, the operation mode is switched to a normal synchronous rectifying mode so that the normal synchronous rectifying operation is started. On the other hand, if the condition of "VPWRCOMP=1 and GNDCOMP=0" is satisfied, every synchronous rectifying is stopped so that the operation mode becomes the coast mode. Note that also when the condition of "VPWRCOMP=1 and GNDCOMP=0" is not satisfied after becoming the synchronous rectifying mode, the operation mode becomes the coast mode.

Figure 20:
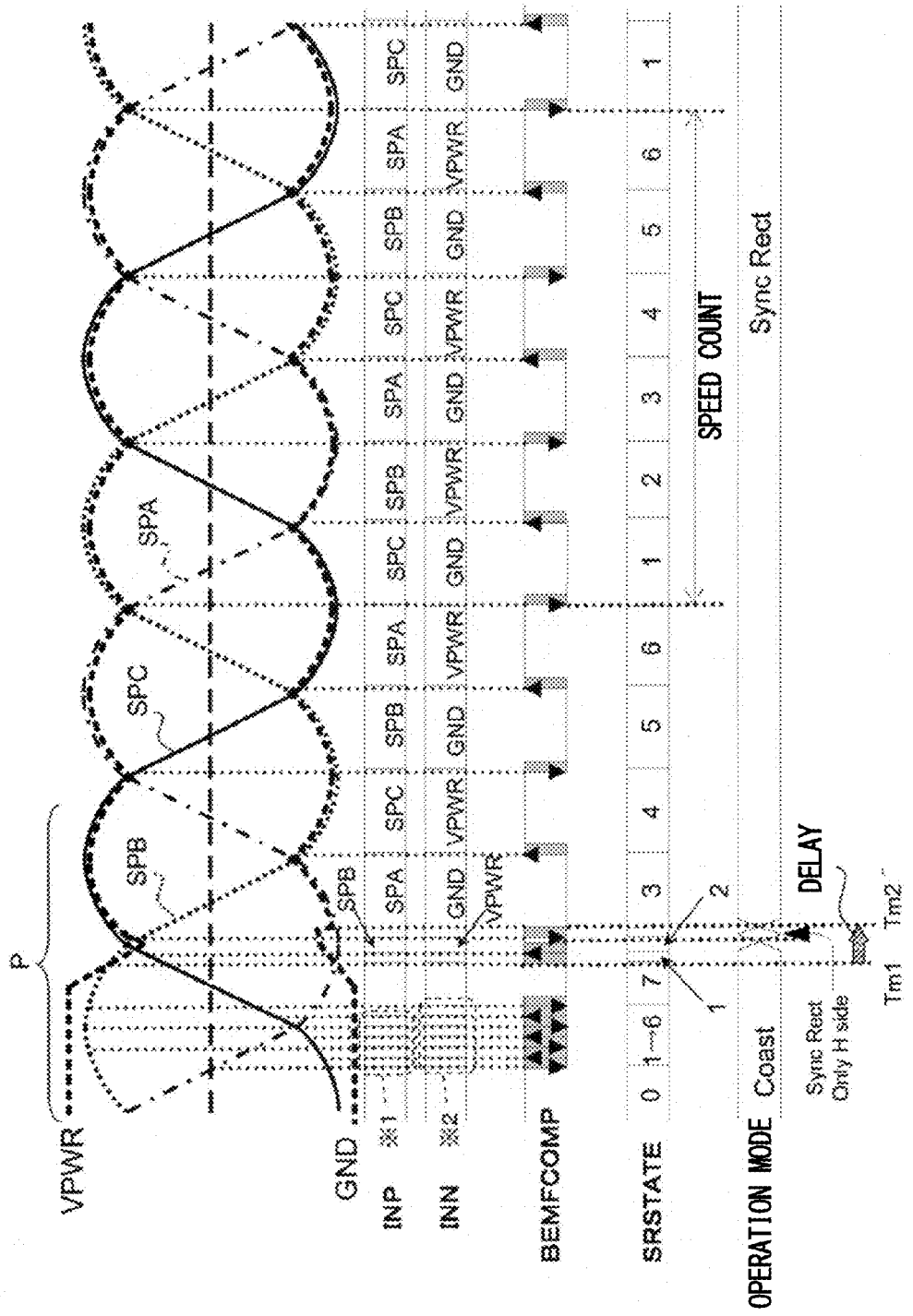
FIG. 20 is an explanatory diagram of a delay in switching operation modes according to the third embodiment.

FIG. 20 illustrates an example of variations of the phase voltage SPx, the voltage VPWR, the voltage GND, the signal INP, the signal INN, the signal BEMFCOMP, SRSTATE, and the operation mode in the same case as that illustrated in FIG. 17. In addition, FIG. 21 is an enlarged chart of the part P illustrated in FIG. 20.

Figure 21:
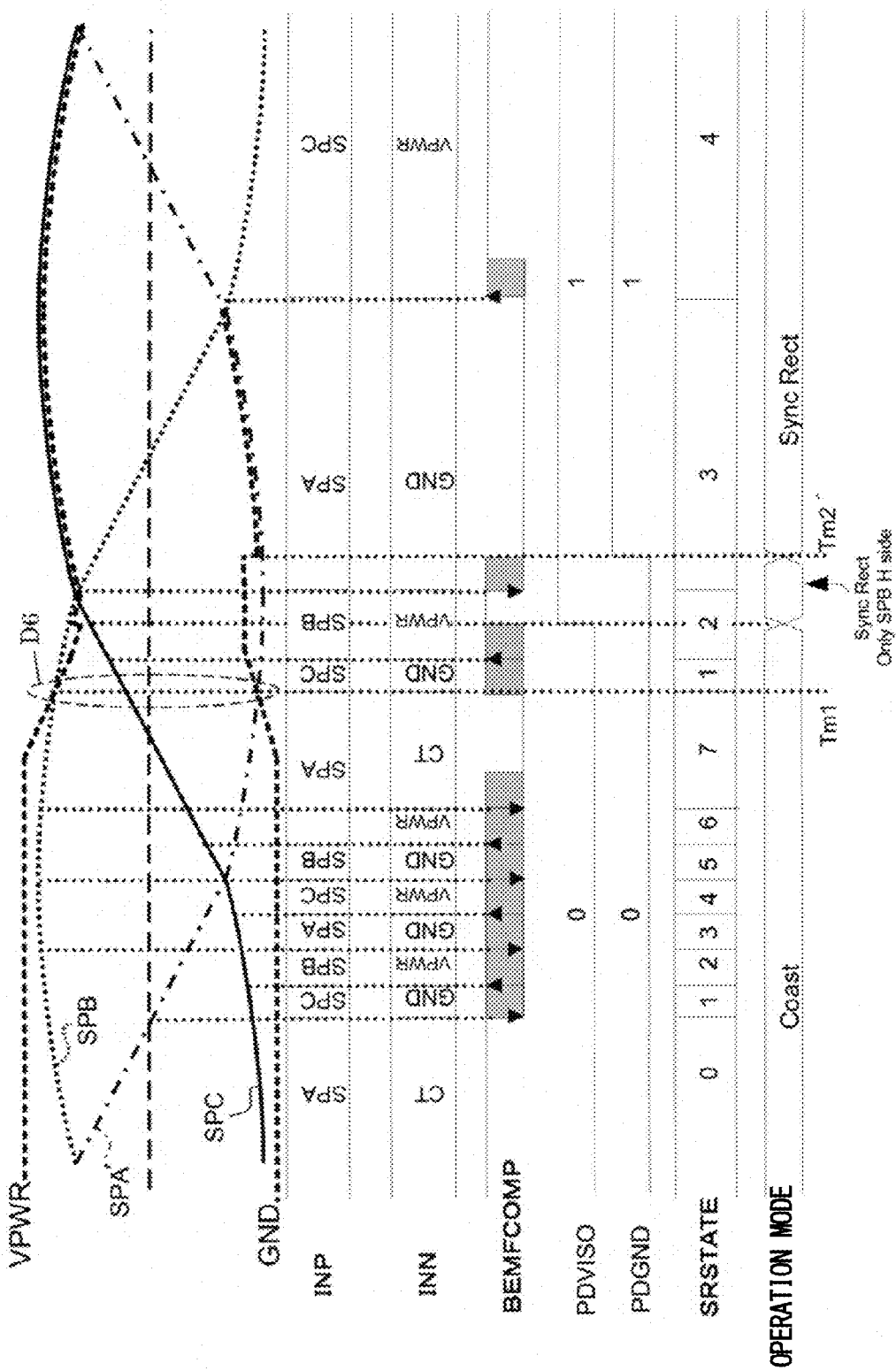
FIG. 21 is an explanatory diagram of a delay in switching operation modes according to the third embodiment.

In the case of the third embodiment, the condition of "VPWRCOMP=1 and GNDCOMP=0" is satisfied at the timing Tm1 as indicated by D6 in FIG. 21, and SRSTATE is set to "1". After that, while the condition of the "VPWRCOMP=1 and GNDCOMP=0" is satisfied, the condition of "PDGND=1" is satisfied. Then, the upper side output synchronous rectifying is started. Further, when the condition of "PDVISO=1" is satisfied, the operation mode is switched to the normal synchronous rectifying mode.

As a result, at timing Tm2' when the condition of "PDVISO=1" is satisfied, the operation mode is switched to the synchronous rectifying mode. In this way, in the third embodiment, as indicated by an arrow in a lower part of FIG. 20, the delay in switching the operation mode is largely reduced compared with the second embodiment (see FIG. 17).

Note that in the case of the third embodiment, compared with the first embodiment, reduction of comparators is also achieved. In this way, the third embodiment has a structure in which both the reduction of the comparator and suppression of the delay in switching the operation mode can be achieved as much as possible. Although the motor driving devices 1 of the embodiments are described above, it is possible to appropriately determine which one of the embodiments should be adopted in accordance with a product specification or required performance.

4. Application Form of Motor Driving Device

[Application to Hard Disk Drive]

Figure 22:
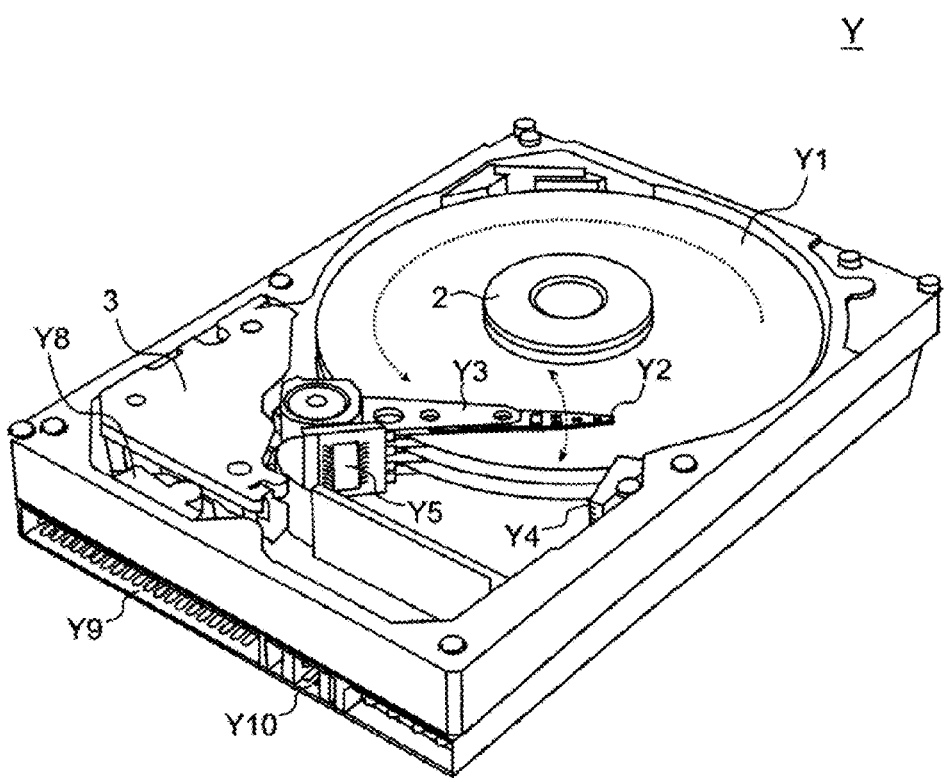
FIG. 22 is a perspective view illustrating a structural example of a hard disk drive according to this embodiment.

FIG. 22 is a perspective view illustrating one structural example of a hard disk drive Y (in a state in which a top cover is removed) equipped with the motor driving device 1 (of any one of the embodiments). The hard disk drive Y is one type of a magnetic disk storage device and includes a platter Y1, a magnetic head Y2, a swing arm Y3, a ramp mechanism Y4, a head amplifier Y5, the spindle motor 2, the voice coil motor 3, a latch mechanism Y8, an interface connector Y9, and a jumper switch Y10.

The platter Y1 is a magnetic disk manufactured by forming a magnetic layer on a surface of an aluminum substrate or a glass substrate. One HDD 53 includes approximately one to four platters Y1. The magnetic head Y2 has a role of reading and writing data on the platter Y1. The swing arm Y3 has a role of carrying the magnetic head Y2 at a distal end.

The ramp mechanism Y4 is a retreat destination of the magnetic head Y2 when the platter Y1 is not rotated, and is disposed outside the outermost periphery of the platter Y1. The head amplifier Y5 has a role of amplifying a reproduced signal obtained by the magnetic head Y2.

The spindle motor 2 has a role of rotating the platter Y1 at a constant rotational frequency (4,200 rpm, 5,400 rpm, 7,200 rpm, 10,000 rpm, 15,000 rpm, or the like). The voice coil motor 3 moves the swing arm Y3 in an arc so that the magnetic head Y2 moves in a radial direction of the platter Y1.

The latch mechanism Y8 has a role of fixing the swing arm Y3 while the hard disk drive Y is stopped. The interface connector Y9 is connected to a host interface circuit mounted on a mother board of a personal computer or the like via a cable. The jumper switch Y10 is used for device setting of the hard disk drive Y (master/slave or the like) using a jumper pin when a plurality of hard disk drives are connected to one personal computer.

In addition, although not illustrated in FIG. 22, the hard disk drive Y is equipped with a printed circuit board on which various electronic circuits are mounted. The motor driving device 1 is mounted on the above-mentioned printed circuit board as means for driving the spindle motor 2 and the voice coil motor 3.

[Application to Desktop Personal Computer]

Figure 23:
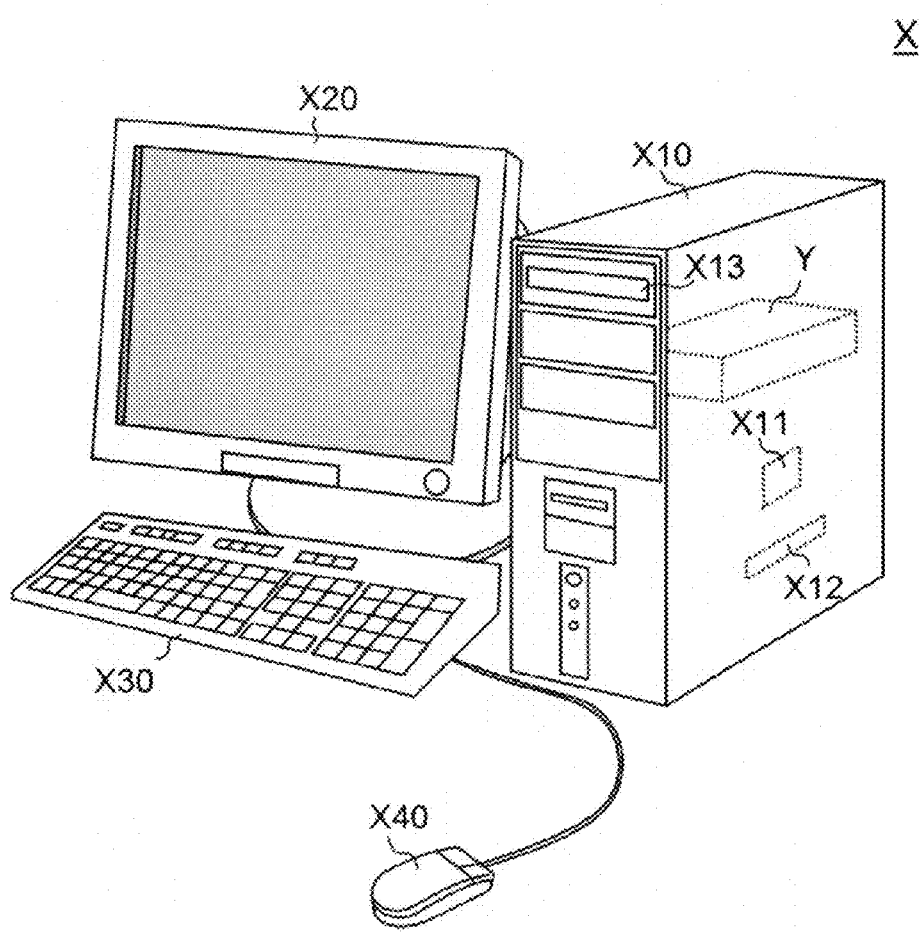
FIG. 23 is an external view illustrating a structural example of a desktop personal computer according to this embodiment.

FIG. 23 is an external view illustrating one structural example of a desktop personal computer X equipped with the hard disk drive Y. The desktop personal computer 9 of this structural example includes a main body case X10, a liquid crystal monitor X20, a keyboard X30, and a mouse X40.

The main body case X10 includes a central processing device X11, a memory X12, an optical drive X13, and the hard disk drive Y. The hard disk drive Y has a role as a large capacity auxiliary storage device for storing programs and data in a nonvolatile manner using a magnetic disk in a sealed case.

The central processing device X11 executes an operating system and various application programs stored in the hard disk drive Y so as to integrally control operation of the desktop personal computer X. The memory X12 is used as a working area for the central processing device X11 (for example, an area for storing task data when a program is executed).

The optical drive X13 performs read/write of an optical disc. As the optical disc, there are a compact disc (CD), a digital versatile disc (DVD), a Blu-ray (registered trademark) disc (BD) and the like. The liquid crystal monitor X20 outputs an image in accordance with an instruction from the central processing device X11. In addition, the keyboard X30 and the mouse X40 are human interface devices for receiving an operation by a user.

Note that desktop personal computer X is an example of the electronic appliance equipped with the hard disk drive Y. Other than that, the hard disk drive Y can be mounted in various electric equipment such as a note personal computer, a tablet personal computer, a hard disk recorder, an audio player, a game machine, and the like.

5. Others

As described above, the motor driving device 1 of each embodiment includes the power supply line L1, and the spindle motor drive unit 10 that performs drive operation for driving the spindle motor 2 using the voltage supplied to the power supply line L1 and synchronous rectifying operation for generating the rectified voltage from the phase voltages of the phases generated when the spindle motor 2 idles so that the regeneration occurs in the power supply line L1.

In addition, the spindle motor drive unit 10 includes the upper switch 11x for switching connection/disconnection between each phase of the spindle motor 2 and the power supply line L1, and the lower switch 12x for switching connection/disconnection between each phase of the spindle motor 2 and the ground point. By switching of the upper switch 11x and the lower switch 12x, the drive operation and the synchronous rectifying operation are executed.

Note that the motor driving device 1 includes the current detector 21 that outputs the signal Sd (comparison signal) indicating a result of the comparison between the detected maximum current value and the threshold value Th. In accordance with this comparison signal, the spindle motor drive unit 10 controls the upper switch 11x and the lower switch 12x. Thus, the motor driving device 1 can secure safety of the device.

In addition, the motor driving device 1 of each of the second and third embodiments includes the selection circuit 22 (first selection circuit) for selecting one of voltages including the phase voltages of the spindle motor 2 as the voltage signal INP (first voltage signal), the selection circuit 24 (second selection circuit) for selecting one of voltages including the voltage VPWR of the power supply line L1 and the ground voltage GND as the voltage signal INN (second voltage signal), and the BEMF comparator 23 that performs output corresponding to a result of the comparison between the voltage signal INP and the voltage signal INN. In this way, while having a function of performing the synchronous rectifying operation, it is easy to reduce the number of comparators.

In addition, the spindle motor drive unit 10 of each of the second and third embodiments performs the synchronous rectifying operation based on an output of the BEMF comparator 23. In addition, the spindle motor drive unit 10 detects the output of the BEMF comparator 23, and based on a result of the detection of the output, the spindle motor drive unit 10 switches the operation mode between the synchronous rectifying mode (first operation mode) in which the synchronous rectifying operation is performed and the coast mode (second operation mode) in which the synchronous rectifying operation is not performed. Note that in the synchronous rectifying mode, the voltage selected by the selection circuits (22 and 24) is switched by a predetermined pattern every time when the output of the BEMF comparator 23 is changed.

In addition, the spindle motor drive unit 10 of each of the second and third embodiments performs a first switching operation for switching from a state in which SRSTATE is "1" (first state) to a state in which SRSTATE is "2" (second state), a second switching operation for switching from a state in which SRSTATE is "2" to a state in which SRSTATE is "3" (third state), a third switching operation for switching from a state in which SRSTATE is "3" to a state in which SRSTATE is "4" (fourth state), a fourth switching operation for switching from a state in which SRSTATE is "4" to a state in which SRSTATE is "5" (fifth state), and a fifth switching operation for switching from a state in which SRSTATE is "5" to a state in which SRSTATE is "6" (sixth state).

In addition, the spindle motor drive unit 10 of each of the second and third embodiments detects an output of the BEMF comparator 23 when a predetermined masking time elapses from execution of the first to fifth switching operations. Further, the first to fifth switching operations are performed in accordance with a change of the output of the BEMF comparator 23 in the synchronous rectifying mode and are performed in accordance with a lapse of masking time in the coast mode.

Note that more specifically, the selection circuit 24 selects one of the voltages including the voltage VPWR of the power supply line L1, the ground voltage GND, and the neutral point voltage CT of the spindle motor 2, as the voltage signal INN.

Further, in the synchronous rectifying mode, the spindle motor drive unit 10 of each of the second and third embodiments performs an operation of switching from a state in which SRSTATE is "6" to the state in which SRSTATE is "1" in accordance with a change of the output of the BEMF comparator. In addition, in the coast mode, the spindle motor drive unit 10 performs an operation of switching from the state in which SRSTATE is "6" to the state in which SRSTATE is "1" via a state in which SRSTATE is "7" and a state in which SRSTATE is "0".

Note that when SRSTATE is "7" and "0", the phase voltage SPA of the A-phase is selected as the voltage signal INP, and the neutral point voltage CT is selected as the voltage signal INN. Thus, in the coast mode, it is possible to appropriately perform the speed count for monitoring the rotation speed of the spindle motor 2 based on a result of the comparison between the phase voltage SPA and the neutral point voltage CT.

In addition, the spindle motor drive unit 10 of the second embodiment switches the operation mode to the coast mode when detecting in the synchronous rectifying mode that the voltage signal INP is smaller than the voltage signal INN when SRSTATE is "1" and that the voltage signal INP is larger than the voltage signal INN when SRSTATE is "1".

In addition, in the coast mode, the spindle motor drive unit 10 of the second embodiment switches the operation mode to the synchronous rectifying mode if it is detected that the voltage signal INP is larger than the voltage signal INN when SRSTATE is one of "1", "3", and "5", or if it is detected that the voltage signal INP is smaller than the voltage signal INN when SRSTATE is one of "2", "4", and "6". In this way in the second embodiment, it is possible to appropriately switch the operation mode.

On the other hand, the spindle motor drive unit 10 of the third embodiment monitors whether or not the voltage VPWR is smaller than one of the phase voltages (SPA to SPC) and whether or not the ground voltage GND is larger than one of the phase voltages (SPA to SPC). Further, on the basis of a result of the detection of the output of the BEMF comparator 23 and a result of the monitoring, the operation mode is switched between the synchronous rectifying mode and the coast mode.

More specifically, in the coast mode, the spindle motor drive unit 10 of the third embodiment switches the operation mode to the synchronous rectifying mode when a second condition that the voltage signal INP is smaller than the voltage signal INN when SRSTATE is one of "1", "3", and "5" and a third condition that the voltage signal INP is larger than the voltage signal INN when SRSTATE is one of "2", "4", and "6" are satisfied, while a first condition that the voltage VPWR is smaller than one of the phase voltages (SPA to SPC) and the ground voltage GND is larger than one of the phase voltages (SPA to SPC) is still satisfied.

In addition, the spindle motor drive unit 10 of the third embodiment switches the operation mode to the coast mode when the first condition is satisfied in the synchronous rectifying mode. In this way in the third embodiment, the operation mode can be appropriately switched.

In addition, in the coast mode, the spindle motor drive unit 10 of the third embodiment starts the switching in the synchronous rectifying operation for the lower switch 12x when the second condition is satisfied while the first condition is still satisfied, and starts the switching in the synchronous rectifying operation for the upper switch 11x when the third condition is satisfied while the first condition is still satisfied. In this way, the synchronous rectifying for the upper side output or the lower side output can be started quickly.

Note that the motor driving device according to the present invention can be applied to an application of driving various motors other than the application of driving the spindle motor as described above. In addition, the motor driving device according to the present invention can be applied to various electronic appliances using a motor other than the electronic appliance described above.

Note that although the best embodiment of the present invention is described above, it is obvious for a skilled person in the art that the disclosed invention can be modified variously and can be embodied in various forms different from the specific structure described above. Therefore, the attached claims are intended to include all variations of the present invention in the technical scope without deviating from the spirit and technical view of the present invention.

What is claimed is:

1. A motor driving device comprising:
    a current detection circuit for detecting a maximum current value in a three-phase motor;
    a power supply line; and
    a motor drive unit configured to perform drive operation for driving the three-phase motor using a voltage supplied to the power supply line and synchronous rectifying operation for generating a rectified voltage from phase voltages of phases generated when the three-phase motor idles so that regeneration occurs in the power supply line,
    wherein the motor drive unit includes:
        three-phase upper switches for switching connection/disconnection between each phase of the three-phase motor and the power supply line; and
        three-phase lower switches for switching connection/disconnection between each phase of the three-phase motor and a ground point, and
    wherein the current detection circuit includes:
        an identifier configured to identify a maximum current phase having a maximum current value among phases of the motor during motor brake during which the three-phase lower switches are all on; and
        a detector configured to:
            detect the maximum current value by adding current values of phases other than the maximum current phase when a current direction in the maximum current phase is a predetermined first direction and
            detect a current value of the maximum current phase as the maximum current value when a current direction in the maximum current phase is a second direction opposite to the first direction.

2. The motor driving device according to claim 1, wherein the identifier includes a current direction detector for detecting the current direction of each phase of the motor and identifies one phase in which the current direction is different from other two phases of the motor as the maximum current phase.

3. The motor driving device according to claim 2, wherein the current direction detector includes a comparator configured to compare a voltage of each phase of the motor with a predetermined voltage, and the identifier detects the current direction of each phase of the motor based on an output of the comparator.

4. The motor driving device according to claim 1, wherein the motor drive unit performs the drive operation and the synchronous rectifying operation by switching of the upper switch and the lower switch, and
    the first direction is a direction from the motor drive unit to the motor.

5. The motor driving device according to claim 4, wherein the current detection circuit outputs a comparison signal indicating a result of the comparison between the detected maximum current value and a predetermined threshold value, and
    the motor drive unit controls the upper switch and the lower switch in accordance with the comparison signal.

6. A magnetic disk storage device comprising:
    a platter;
    a magnetic head for reading and writing data on the platter;
    a swing arm for carrying the magnetic head on a distal end;
    a spindle motor for rotating the platter;
    a voice coil motor for moving the swing arm in an arc; and
    a motor driving device according to claim 1 for driving the spindle motor.

7. The magnetic disk storage device according to claim 6, wherein the motor driving device is configured to drive the spindle motor and the voice coil motor.

8. An electronic appliance comprising the magnetic disk storage device according to claim 6.

9. An electronic appliance comprising:
    the motor driving device according to claim 1; and
    a motor driven and controlled by the motor driving device.

* * * * *